US009298041B2

(12) United States Patent
Escuti et al.

(10) Patent No.: US 9,298,041 B2
(45) Date of Patent: *Mar. 29, 2016

(54) MULTI-TWIST RETARDERS FOR BROADBAND POLARIZATION TRANSFORMATION AND RELATED FABRICATION METHODS

(71) Applicant: North Carolina State University, Raleigh, NC (US)

(72) Inventors: Michael J. Escuti, Cary, NC (US); Ravi K. Komanduri, Raleigh, NC (US); Kristopher F. Lawler, Jr., Cary, NC (US)

(73) Assignee: North Carolina State University, Raleigh, NC (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/646,166

(22) Filed: Oct. 5, 2012

(65) Prior Publication Data

US 2013/0027656 A1    Jan. 31, 2013

Related U.S. Application Data

(63) Continuation-in-part of application No. 12/596,189, filed as application No. PCT/US2008/004888 on Apr. 16, 2008, now Pat. No. 8,339,566.

(60) Provisional application No. 61/544,936, filed on Oct. 7, 2011, provisional application No. 60/912,044, filed on Apr. 16, 2007.

(51) Int. Cl.
*G02F 1/1335* (2006.01)
*G02F 1/13363* (2006.01)
*G02B 5/30* (2006.01)

(52) U.S. Cl.
CPC ........ *G02F 1/133636* (2013.01); *G02B 5/3083* (2013.01)

(58) Field of Classification Search
None
See application file for complete search history.

(56) References Cited

U.S. PATENT DOCUMENTS 5,245,596 A    9/1993  Gupta et al.
6,252,710 B1   6/2001  Fan et al.
(Continued)

FOREIGN PATENT DOCUMENTS

EP    0525478 A2    2/1993
EP    0632311 A1    1/1995
(Continued)

OTHER PUBLICATIONS

Komanduri, R.K. et al., "Multi-twist retarders: broadband retardation control using self-aligning reactive liquid crystal layers", *Optics Express*, Received Sep. 17, 2012, Published Jan. 4, 2013, vol. 21, No. 1, 404-420.

(Continued)

*Primary Examiner* — Tina Wong
(74) *Attorney, Agent, or Firm* — Myers Bigel & Sibley, PA

(57) ABSTRACT

An optical element includes at least two stacked birefringent layers having respective local optical axes that are rotated by respective twist angles over respective thicknesses of the at least two layers, and are aligned along respective interfaces between the at least two layers. The respective twist angles and/or the respective thicknesses are different. The at least two stacked birefringent layers may be liquid crystal polymer optical retarder layers. Related devices and fabrication methods are also discussed.

30 Claims, 16 Drawing Sheets

(56) References Cited

U.S. PATENT DOCUMENTS

| | | | |
|---|---|---|---|
| 7,187,424 | B2 | 3/2007 | Parri et al. |
| 7,692,759 | B2 | 4/2010 | Escuti et al. |
| 8,520,170 | B2 * | 8/2013 | Escuti et al. ............... 349/96 |
| 2002/0180912 | A1 | 12/2002 | Hsieh et al. |
| 2004/0156105 | A1 | 8/2004 | Trapani et al. |
| 2005/0140837 | A1 | 6/2005 | Crawford et al. |
| 2005/0213023 | A1 | 9/2005 | Kashima |
| 2006/0152656 | A1 | 7/2006 | Kashima et al. |
| 2008/0278675 | A1 | 11/2008 | Escuti et al. |
| 2010/0059709 | A1 | 3/2010 | Bachels et al. |
| 2010/0171909 | A1 | 7/2010 | Handschy |
| 2010/0225876 | A1 | 9/2010 | Escuti et al. |
| 2011/0188120 | A1 | 8/2011 | Tabirian et al. |
| 2011/0262844 | A1 | 10/2011 | Tabirian et al. |

FOREIGN PATENT DOCUMENTS

| | | |
|---|---|---|
| JP | 2002189124 | 7/2002 |
| WO | WO2006/092758 A2 | 9/2006 |
| WO | WO 2006/092758 A2 | 9/2006 |

OTHER PUBLICATIONS

Jones et al., *P-209: Evaluation of Projection Schemes for the Liquid Crystal Polarization Grating Operating on Unpolarized Light;* 2006 SID International Symposium, Society for Information Display; vol. XXXVI, pp. 1015-1017, May 24, 2005.

Dozov et al., *Planar Degenerated Anchoring of Liquid Crystals Obtained by Surface Memory Passivation,* Applied Physics Letters, AIP, American Institute of Physics, vol. 77, No. 25; pp. 4124-4126, Dec. 18, 2000.

Zhan et al., *Polarization Properties of Inversely twisted Nematic Liquid-Crystal Gratings;* Applied Optics Society of America, vol. 37, No. 28, pp. 6755-6763, Oct. 1, 1998.

Zhang et al. *Application of Photoalignment Technology to Liquid-Crystal-on-Silicon Microdisplays;* Japanese Journal of Applied Physics, vol. 44, No. 6A, pp. 3983-3991, (2005).

Sieberle, et al., *Photoalignment of LCoS LCDs,* Journal of the Society for Information Display, vol. 10, No. 1, pp. 31-35, (2002).

Zhang et al., *Silicon Microdisplay with Photo-alignment,* IEEE, Optoelectronics, Proceedings of the Sixth Chinese Symposium, pp. 228-230, Sep. 12-14, 2003.

Escuti et al., *39.4: Polarization-Independent Switching with High Contrast from a Liquid Crystal Polarization Grating;* Society for Information Display, vol. XXXVII, pp. 1443-1446, May 24, 2005.

Oh et al., *P-167 FDTD and Elastic Continuum Analysis of the Liquid Crystal Polarization Grating, g;* Society for Information Display, vol. XXXVII, pp. 844-847, May 24, 2005.

Avrutsky, et al., *High-Efficiency Single-Order Waveguide Grating Coupler,* Optical Society of America, vol. 15., No. 24; pp. 1446-1448, Dec. 15, 1990.

Crawford et al., *Liquid-Crystal Diffraction Gratings Using Polarization Holography Alignment Techniques,* Journal of Applied Physics, vol. 98, No. 12, pp. 123102-1-123102-10; Dec. 27, 2005.

Oh et al., *L-6: Late-News Paper: Achromatic Diffraction Using Reactive Mesogen Polarization Gratings,* Society for Information Display, vol. XXXVIII, pp. 1401-1404, May 20, 2007.

Lu et al., *Low Voltage and Wide-Viewing-Angle Twisted Nematic Liquid Crystal Displays by Optical Compensation,* Japanese Journal of Applied Physics, vol. 39, No. 5A, Part 2; pp. L412-L415, May 1, 2000.

International Search Report, PCT/US2008/004888 and Written Opinion; Jul. 2, 2008.

International Preliminary Report on Patentability, PCT/US2008/004888; May 8, 2009.

Examination Report corresponding to European Patent Application No. 08742945.2 dated Jun. 4, 2010.

Examination Report corresponding to European Patent Application No. 08742939.5 dated Jun. 4, 2010.

First Office Action corresponding to Chinese Patent Application No. 2008-80012098.5; Date of Issue: Mar. 17, 2011; 16 pages.

First Office Action corresponding to Chinese Patent Application No. 2008-80012188.4; Date of Issue: Mar. 7, 2011; 8 pages.

Communication pursuant to Article 94(3) EPC corresponding to European Application No. 08 742 943.7 dated Apr. 8, 2011; 4 pages.

Communication pursuant to Article 94(3) EPC corresponding to European Application No. 08 742 945.2 dated Apr. 8, 2011; 4 pages.

European Communication Corresponding to European Application No. 11 178 032; Dated: Oct. 7, 2011; 10 pages.

Summons to Attend Oral Proceedings Corresponding to European Application No. 08742945.2; Dated: Feb. 21, 2012; 4 pages.

Pancharatnam S; "Achromaic Combinations of Birepringent Paltes—Part I.: An Achromatic circular polarizer", Proceedings of the Indian Academy of Sciences. Section B, Biological Sciences, Indian Academy of Sciences, Bangalore, IN; vol. 41, Mar. 1, 1955; pp. 130-136.

Second Office Action issued in corresponding Chinese Patent Application No. 200880012154.5; Dated: Mar. 28, 2012; 8 pages.

Boulbry B. et al., "Polarization errors associated with zero-order achromatic quarter-wave plates in the whole visible spectral range", *Optics Express,* Aug. 27, 2001, vol. 9, No. 5, pp. 225-235.

Broer D.J. et al., "Three Dimensionally Ordered Polymer Networks with a Helicoidal Structure", *Macromolecules,* 1990, 23, 2474-2477.

Broer D.J. et al., "Wide-band reflective polarizers from cholesteric polymer networks with a pitch gradient", *Nature,* vol. 378, Nov. 1995, pp. 467-469.

Clarke D., "Achromatic Halfwave Plates and Linear Poliarization Rotators", *Optica Acta: International Journal of Optics,* 1967, 14:4, 343-350.

Destriau G. et al., "Realisation dun quart donde quasi achromatique par juxtaposition de deux lames cristallines de meme nature", *J. Phys. Radium,* 10, 53-55, 1949.

Hariharan P., "Achromatic and apochromatic halfwave and quarterwave retarders", *Opt. Eng.,* 35(11), 3335-3337, Nov. 1996.

International Search Report Corresponding to International Application No. PCT/US2012/059008; Date of Mailing: Dec. 26, 2012; 10 Pages.

Kelly S. "Anisotropic Networks", *J. Mater. Chem.,* 1995, 5(12), 2047-2061.

Kim J. et al., "Efficient and monolithic polarization conversion system based on a polarization grating", *Appl. Opt.,* vol. 51, Issue 20, pp. 4852-4857, 2012.

Koester C.J. "Achromatic Combinations of Half-Wave Plates", *J. Opt. Soc. Am,* vol. 49, Issue 4, pp. 405-407, 1959.

Komanduri R. et al., "Multi-twist retarders for broadband polarization transformation", *Proc. SPIE* vol. 8279, 1-10, 2012.

Lavrentovich M.D. et al., "Switchable broadband achromatic half-wave plate with nematic liquid crystals", *Opt. Lett.* 29, 1411-1413, 2004.

Li Y. et al., "Broadband orbital angular momentum manipulation using liquid crystal thin-films", *Proc. SPIE* vol. 8274, 1-8, 2012.

Mattoussi H. et al., "Birefringence and Dispersion of Uniaxial Media", *Mol. Cryst. Liq. Cryst.,* 1992, 223:1, 69-84.

Mawet D. et al., "Taking the vector vortex coronagraph to the next level for ground- and space-based exoplanet imaging instruments: review of technology developments in the USA, Japan, and Europe", *Proc SPIE* vol. 8151, 1-14, 2011.

Mcintyre C.M. et al., "Achromatic wave plates for the visible spectrum", *J. Opt. Soc. Am.* 58, 1575-1580, 1968.

Oh C. et al., "Achromatic diffraction from polarization grating with high efficiency", *Opt. Lett.* vol. 33, Issue 20, pp. 2287-2289, 2008.

Pancharatnam S., "Achromatic combinations of birefringent plates: Part I. An Achromatic Circular Polarizer," *Proc. Ind. Acad. Sci.* A 41, 130-136, 1955.

Pancharatnam S., "Achromatic combinations of birefringent plates: Part II. An Achromatic Quarter-Wave Plate," *Proc. Ind. Acad. Sci. A* 41, 137-144, 1955.

Parri, O. et al., "Patterned Retarder Films using Reactive Mesogen Technology", *Proc. SPIE,* 7956, 1-11, 2011.

Samoylov A.V. et al., "Achromatic and super-achromatic zero-order waveplates", *J. Quant. Spectrosc. Radiat. Transfer,* 88, 319-325, 2004.

(56) References Cited

OTHER PUBLICATIONS

Schadt M. et al., "Photo-Induced Alignment and Patterning of Hybrid Liquid Crystalline Polymer Films on Single Substrates", *Jpn. J. Appl. Phys.*, vol. 34, 1995, pp. L764-L767.

Schirmer J. et al., "Liquid crystal phase retarder with broad spectral range", *Optics Communications,* 2000, 176: 313-317.

Shen S. et al., "Optimal design of achromatic true zero-order waveplates using twisted nematic liquid crystal", *J. Opt. Soc. Am. A.* May 2005, 22(5):961-5.

Tang S.T. et al., "Mueller calculus and perfect polarization conversion modes in liquid crystal displays", *J. Appl. Phys.* 89, 5288-5294, 2001.

Wu T.X. et al., "Design Optimization of Broadband Linear Polarization Converter Using Twisted Nematic Liquid Crystal", *Jpn. J. Appl. Phys.* vol. 42, 2003, pp. L39-L41.

Yoon K. et al., "Application of Twisted Retarders to a Cholesteric Liquid Crystal Polarizer for the Control of Output Polarization States", *Jap. J. Appl. Phys.* 48, 1-6, 2009.

Zhuang Z. et al., "Achromatic linear polarization rotator using twisted nematic liquid crystals", *Appl. Phys. Lett.* 76, 3995-3997, 2000.

Notification Concerning Transmittal of International Preliminary Report on Patentability, Application No. PCT/US12/59008, Date of Mailing: Oct. 10, 2013, 5 pages.

She, J. et al, "Optimal design of achromatic quarter-wave plate using twisted nematic liquid crystal cells", Optical and Quantum Electronics (2005) 37:625-634.

Extended European Search Report for EP Application No. 12837734.8 mailed Apr. 17, 2015.

\* cited by examiner

ANALYZER 90°
(PARALLEL)

ANALYZER 45°

ANALYZER 90°
(CROSSED)

LEGEND FOR CURVES (POLAR, AZIMUTH):
- ———— (0°, 45° & 0°)
- – – – – (25°, 45°)
- – · – · – (50°, 45°)
- ········ (75°, 45°)
- – – – (25°, 0°)
- – · – (50°, 0°)
- ····· (75°, 0°)

MULTI-TWIST RETARDERS FOR BROADBAND POLARIZATION TRANSFORMATION AND RELATED FABRICATION METHODS

CROSS-REFERENCE TO RELATED APPLICATIONS

The present application is a continuation-in-part of U.S. patent application Ser. No. 12/596,189, which is a 35 USC §371 national phase application of PCT International Application No. PCT/US2008/004888 having an international filing date of Apr. 16, 2008, which claims priority to U.S. Provisional Patent Application No. 60/912,044, entitled "Low-Twist Chiral Liquid Crystal Polarization Gratings and Related Fabrication Methods", filed Apr. 16, 2007, the disclosures of which are hereby incorporated herein by reference as if set forth in their entireties. The present application also claims priority under 35 U.S.C. §119 to U.S. Provisional Patent Application No. 61/544,936 entitled "Multi-Twist Retarders For Broadband Polarization Transformation And Related Fabrication Methods," filed Oct. 7, 2011, the disclosure of which is incorporated by reference herein in its entirety.

FIELD

The present invention relates to polarization transformation and related systems.

BACKGROUND

The polarization of light is described by specifying the orientation of the wave's electric field at a point in space over one period of the oscillation. Polarization transformation is used in many optical devices, including, but not limited to, liquid crystal displays (LCDs), optical storage (e.g., CD/DVD/Blu-ray), 3D movie cinemas, optical remote sensing, and optical fiber networks. Polarization transformation that can be precisely controlled for incident light over a broad range of wavelengths is referred to as broadband (or achromatic) polarization transformation, and can be used in applications that involve human perception or multiple simultaneous channels at different wavelengths.

Polarization is a non-scalar quantity of light, which may be fully-, partially-, or un-polarized. One of way of describing polarization is the Stokes vector, which describes the possible polarization states as four intensities: $S=[S_0\ S_1\ S_2\ S_3]^T$. Optical elements that transform polarization can be described with 16 parameters that are most often arranged into a 4×4 Mueller matrix M. Accordingly, an input polarization $S_{IN}$ can be transformed into an output polarization $S_{OUT}$ by the following relation: $S_{OUT}=M \cdot S_{IN}$. For almost all birefringent components used in this context, many of the elements of the matrix M can vary strongly with wavelength, which can make broadband polarization transformation challenging. Some examples of elements that provide polarization transformation are quarterwave retardation elements (which can be used to transform light having linear polarization to circular polarization, or vice versa), and halfwave retardation elements (which can transform light having linear polarization to a different linear polarization direction, or vice versa).

Narrowband (or strongly chromatic) polarization transformation can be achieved with homogeneous retarders with uniaxial birefringence, typically called waveplates. These waveplates have phase retardation that varies strongly with wavelength (i.e., $\Gamma=2\pi(n_e-n_o)d/\lambda=2\pi\Delta n d/\lambda$, where $\Delta n=(n_e-n_o)$ is the birefringence), and an optical axis along the extraordinary index direction that does not vary strongly with wavelength. Waveplates can be formed with a wide variety of materials, including but not limited to birefringent crystals, stretched polymer films, and liquid crystal layers.

Broadband polarization transformation can be accomplished by combining at least two waveplates formed from different materials, in such a way that their fast and slow optical axes are opposed. This approach may rely on having an appropriate difference in the dispersion of the materials' birefringence. For example, crystal quartz and magnesium fluoride waveplates can be used for broadband polarization transformation. However, the availability of such natural minerals or grown crystals, as well as the size and cost of such elements, can be prohibitive in many cases, among other limitations related to performance.

Alternatively, broadband polarization can be accomplished using two or more discrete waveplates, typically formed of the same material, where optical axis orientations and individual retardations of the waveplates are not usually orthogonal. Some examples of this technique involve three waveplates, but it is also possible to implement embodiments with two, five, six, or more waveplates. While these waveplates can be formed with many types of available birefringent films (such as those mentioned above for narrowband waveplates, including liquid crystal layers), it may be necessary to form each discrete waveplate on its own as a physically separate element, and then subsequently assemble each separate element with a high level of precision relative to the other elements. This approach can substantially add to fabrication costs, can often lead to thick (i.e., many mm or cm) components, and can resulted in a constrained angular aperture, among other limitations.

An additional category of broadband polarization transforming elements includes single inhomogeneous birefringent layers, typically formed with uniaxially birefringent materials that have a local optical axis that is not uniform throughout the thickness. These birefringent layers have been used in LCDs and other optical devices. These birefringent layers can form the addressable layer, such as the 90° twisted nematic (TN) and super-twisted nematic (STN) LCDs, as well as compensation films with positive and negative birefringence. While these birefringent layers can act as polarization transformation elements, often with some achromatic behavior, they can have limitations with regard to the types of input and output polarizations that may be transformed. For example, 90°-TN and STN birefringent layers may only transform linear to near-linear polarizations, and many compensation films may make only small adjustments to the polarization. Also, a single twist layer can be used as a retarder to partially convert the circular polarization to linear polarization (for a single wavelength) over a relatively narrow bandwidth range. While this single twist layer may be combined with a cholesteric polarizer, these elements may be formed separately and subsequently assembled with each other, similarly resulting in problems with fabrication costs, thickness, performance, etc.

Combinations of twisted layers have also been used for broadband polarization transformation. For example, U.S. Pat. No. 6,765,635 describes two 135° twisted nematic layers on either side of a uniaxial halfwave layer can be employed as an electrically controlled polarization modulator. In another case, a broadband quarterwave retarder is provided using two twisted nematic cells, fabricated separately and subsequently assembled.

SUMMARY

According to some embodiments of the present invention described herein, an optical film includes a first optical layer wherein respective local optical axes are rotated by a first twist angle over a first thickness defined between opposing faces of the first optical layer, and a second optical layer wherein respective local optical axes are rotated by a second twist angle over a second thickness defined between opposing faces of the second optical layer. For example, a local anisotropy of the first layer may have a first continuously variable phase shift over the first thickness, a local anisotropy of the second layer may have a second continuously variable phase shift over the second thickness. In some embodiments, the respective relative orientations of the molecules of the first and second layers (and thus, their local optical axes) are aligned along an interface therebetween.

In some embodiments, the first and second optical layers may be first and second retarder layers that alter a polarization state of the light passing therethrough without substantially affecting a direction of propagation thereof over a broadband wavelength range. For example, the relative orientations of the molecules of the first and/or second optical layers may be substantially uniform in the transverse dimension, so as not to substantially alter the direction of propagation of light passing therethrough. In other embodiments, the relative orientations of the molecules of the first and/or second optical layers may be continuously varying in the transverse dimension.

In some embodiments, the first and second layers may be assembled to define a monolithic structure. For example, the second optical layer may be directly on the first optical layer, and the molecules of the second optical layer may be aligned by the molecules of the first optical layer.

In some embodiments, the optical film may include an alignment surface having an alignment condition defining a substantially uniform domain therein. The alignment surface may not substantially affect the local polarization state of light traveling therethrough. The first optical layer may be directly on the alignment surface, and the molecules of the first layer may be aligned according to the alignment condition of the alignment surface. The first layer, the second layer, and/or the alignment surface may be substantially transparent.

In some embodiments, the first optical layer may be a first chiral liquid crystal layer including chiral liquid crystal molecules therein having a first twist sense, and the second optical layer may be a second chiral liquid crystal layer including chiral liquid crystal molecules therein having a second twist sense. The first twist sense may be the same as or opposite to the second twist sense in some embodiments.

In some embodiments, the first and second thicknesses are different. In some embodiments, the first and second twist angles are different. For example, the second twist angle may be about 0 degrees, and the first twist angle may be greater than or less than 0 degrees, or vice versa, in some embodiments.

In some embodiments, at least one of the first and second optical layers may be a polymerized or a polymerizable liquid crystal layer. In other embodiments, at least one of the first and second optical layers may be a non-reactive switchable liquid crystal layer. In some embodiments, at least one of the first and second optical layers may be a switchable liquid crystal layer that may be switched between a first state that does not substantially affect the polarization of the light traveling therethrough and a second state that reverses or otherwise alters the polarization of the light traveling therethrough.

In some embodiments, the first and/or second twist angles and/or the first and/or second thicknesses are configured to provide quarterwave retardation over a broadband wavelength range. In some embodiments, the first and/or second twist angles and/or the first and/or second thicknesses are configured to provide halfwave retardation over a broadband wavelength range. The broadband wavelength range may include the range of visible wavelengths, for example, about 400 nm (nanometers) to about 800 nm. In other embodiments, the broadband wavelength range may include a near-infrared range (for example, about 1000 nm to about 1600 nm), a mid-wave infrared range (for example, about 4000 nm to about 10,000 nm), or an ultraviolet range (for example, about 180 nm to about 400 nm). The retardation may be substantially achromatic over a particular wavelength range, or different regions of a wavelength range may have different retardations.

According to further embodiments of the present invention, a method of forming an optical film includes forming an alignment surface including an alignment pattern therein, and forming a first optical layer having a molecular structure wherein respective relative orientations of molecules are rotated by a first twist angle over a first thickness defined between opposing faces of the first optical layer. The molecules of the first layer are aligned in accordance with the alignment pattern of the alignment surface along the interface therebetween. A second optical layer is formed on a surface of the first optical layer opposite the alignment layer. The second optical layer has a molecular structure wherein respective relative orientations of molecules are rotated by a second twist angle over a second thickness defined between opposing faces of the second optical layer. The molecules of the second optical layer are aligned based on the surface of the first optical layer such that respective relative orientations of the molecules of the first and second layers are aligned along an interface therebetween.

According to still further embodiments of the present invention, a birefringent retarder includes an alignment surface, with spatially uniform azimuth and tilt angle boundary conditions, and at least two general twisted nematic liquid crystal layers. The first layer has a first twist angle and thickness, and the second layer has a second twist angle and thickness, where at least one of the first and second twist angles or the first and second thicknesses are different, and where at least one of the first and second twist angles is not zero. The first layer is applied directly onto and aligned by the alignment surface, and the second layer is directly aligned by a surface of the first layer on which it is formed, forming a monolithic structure.

According to some embodiments of the present invention described herein, an optical element comprises a plurality of stacked birefringent layers, including first and second stacked birefringent layers having respective local optical axes that are rotated by respective twist angles over respective thicknesses of the first and second layers. The local optical axes are aligned along an interface between the first and second layers, and the respective twist angles and/or the respective thicknesses are different. For example, the first and second stacked birefringent layers can be optical retarder layers that are respectively configured to alter a polarization without substantially altering a propagation direction of light passing therethrough.

In some embodiments, the respective local optical axes of the first and second stacked birefringent layers may be aperiodic in a direction along the interface therebetween. For example, the respective local optical axes may be substantially uniform in one or more different regions along the interface, or may be continuously varying along the interface.

In some embodiments, the respective local optical axes of the first and second stacked birefringent layers may be substantially uniform or non-varying in a direction along the interface therebetween.

In some embodiments, the first and second stacked birefringent layers are directly on one another and define a monolithic structure.

In some embodiments, the optical element may include an alignment surface having a substantially uniform alignment condition. One of the first and second stacked birefringent layers may be directly on the alignment surface such that the respective local optical axes thereof are aligned according to the alignment condition.

In some embodiments, the respective twist angles may have a same or opposite twist sense. In some embodiments, the respective twist angles may be substantially equal in magnitude and opposite in twist sense. In some embodiments, the respective twist angles may be different in magnitude, and one of the twist angles may be non-zero.

In some embodiments, the first and second stacked birefringent layers may respectively include first and second adjacent regions. The respective local optical axes of the first and second birefringent layers may be substantially uniform in each of the first and second regions along the interface therebetween, but the respective local optical axes in the first and second regions may differ.

In some embodiments, the first and second stacked birefringent layers may include a first liquid crystal layer and a second liquid crystal layer stacked thereon. Respective molecular orientations of the first and second liquid crystal layers may be aligned along the interface therebetween, and at least one of the first and second liquid crystal layers may be a chiral layer.

In some embodiments, at least one of the first and second liquid crystal layers may be a polymerized liquid crystal layer.

In some embodiments, another of the first and second liquid crystal layers may be a switchable liquid crystal layer.

In some embodiments, a third chiral liquid crystal layer may be stacked on the second liquid crystal layer.

In some embodiments, the optical element may further include a linear polarizer. The first and second optical layers may be stacked on the linear polarizer with an alignment surface or an adhesive layer between the polarizer and the optical layers.

In some embodiments, the respective twist angles and/or thicknesses of the first and second optical layers may be configured to provide halfwave retardation that is substantially achromatic over a broadband wavelength range of about 200 nm or more.

In some embodiments, the respective twist angles and/or thicknesses of the first and second optical layers are configured to provide quarterwave retardation that is substantially achromatic over a broadband wavelength range of about 200 nm or more.

According to further embodiments of the present invention described herein, a method of fabricating an optical element includes providing a first birefringent layer, and providing a second birefringent layer stacked on the first birefringent layer. The first and second birefringent layers have respective local optical axes that are rotated by respective twist angles over respective thicknesses thereof and are aligned along an interface therebetween, and the respective twist angles and/or the respective thicknesses are different.

In some embodiments, the respective local optical axes of the first and second birefringent layers may be aperiodic in a direction along the interface therebetween.

In some embodiments, the first and second birefringent layers may be optical retarder layers that are respectively configured to alter a polarization without substantially altering a propagation direction of light passing therethrough.

In some embodiments, the respective local optical axes of the first and second birefringent layers may be substantially uniform or non-varying in a direction along the interface therebetween.

In some embodiments, the first and second birefringent layers may define a monolithic structure. For example, the first and second birefringent layers may be liquid crystal layers, and the second birefringent layer may be formed directly on the first birefringent layer such that respective molecular orientations thereof are aligned according to respective molecular orientations of the first birefringent layer along the interface therebetween, In some embodiments, prior to forming the first and second birefringent layers, an alignment surface having an aperiodic alignment condition may be formed. The aperiodic alignment condition may include one or more substantially uniform regions, or may be continuously varying. The first birefringent layer may be formed directly on the alignment surface such that the respective molecular orientations thereof are aligned according to the alignment condition.

In some embodiments, the first birefringent layer may be a polymerizable liquid crystal layer. The first birefringent layer may be photo-polymerized on the alignment surface prior to forming the second birefringent layer thereon.

In some embodiments, a third liquid crystal layer may be formed directly on the second birefringent layer such that the respective local optical axes thereof are aligned according to the respective local optical axes of the second birefringent layer along the interface therebetween.

In some embodiments, the alignment surface may be formed to include a continuously varying alignment condition.

In some embodiments, the alignment surface may be formed to include respective substantially uniform alignment conditions in adjacent first and second regions thereof, where the substantially uniform alignment conditions in the first and second regions of the alignment surface differ.

Accordingly, some embodiments of the present invention provide an optical retarder element including at least two stacked optical layers having respective local optical axes that continuously vary in a direction over the respective thicknesses thereof, and are aligned (but may or may not vary) in a direction along respective interfaces therebetween.

Other devices and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1:
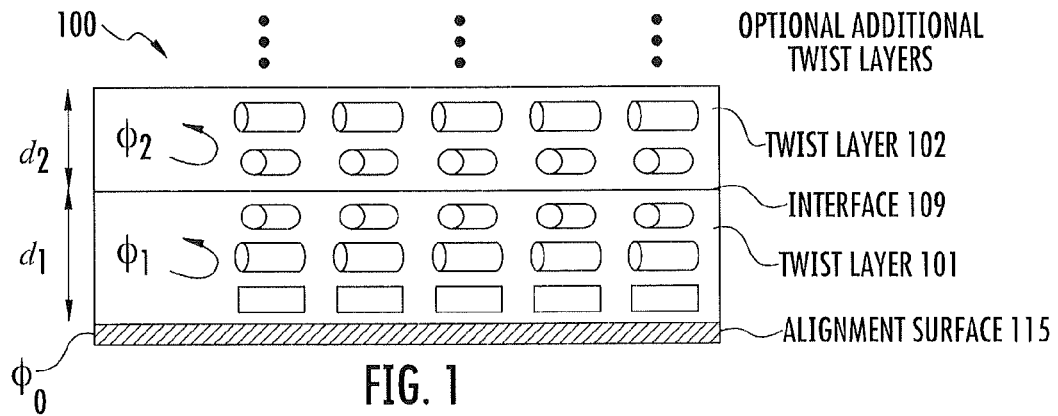
FIG. 1 is a schematic diagram illustrating an optical retarder element including two or more stacked birefringent layers in accordance with some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the present invention are described herein with reference to liquid crystal (LC) materials. LCs may include liquids in which an ordered arrangement of molecules exists. Typically, LC molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties. As used herein, the LCs can have a nematic phase, a chiral nematic phase, a smectic phase, a chiral smectic phase (including ferroelectric LCs), and/or another phase. As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a predictable and controllable way. In some embodiments, the alignment surface may ensure a single domain through the LC layer. In other embodiments, the alignment surface may provide many domains and/or many discontinuities throughout the LC layer.

A number of polymers, such as rubbed or photopolymerizable polymers, may be used as alignment layers to create the optical layers described herein. These polymers may be inert with respect to the LC, should provide stable alignment over a range of operating temperatures of the LC device (e.g., from about −50° C. to about 100° C.), and should be compatible with manufacturing methods described herein. Some examples of polymers that may be used as alignment layers herein include polyimides, cinnamates, chalcone-epoxy materials, and coumarin side chain polyimides. Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials.

It will be understood by those having skill in the art that, as used herein, "polymerizable liquid crystals" may refer to relatively low-molecular weight liquid crystal materials that can be polymerized, and may also be described herein as "reactive mesogens." In contrast, "non-reactive liquid crystals" may refer to relatively low-molecular weight liquid crystal materials that may not be polymerized. Also, a "transmissive" or "transparent" substrate or element may allow at least some of the incident light to pass therethrough. In other words, transmissive or transparent elements described herein need not be perfectly transparent, and may have isotropic or dichroic absorption characteristics and/or may otherwise absorb some of the incident light. A transparent substrate may be a glass substrate in some embodiments. In contrast, a "reflective" substrate or element may reflect at least some of the incident light.

Some embodiments of the present invention provide methods and devices that can achieve broadband polarization transformation, whereby input light having a particular polarization can be changed to a target or desired polarization. This stands in contrast to the polarization conversion achieved by conventional polarizer elements, whereby light of a desired polarization is permitted to pass through and unwanted light is absorbed or redirected. Precise polarization transformation of broadband light can be used in many applications, including LCDs, optical storage, birefringent optics, optical remote sensing, and optical fiber networks. Conventional methods using individual and multiple stacks of simple birefringent elements, which are separately formed and subsequently assembled, may be unable to achieve the desired broadband polarization transformation performance, and/or may not easily offer large clear apertures, small thicknesses, and/or acceptable cost.

In particular, embodiments of the present invention described herein provide an optical element including two or more birefringent layers, referred to herein as Multi-Twist Retarders (MTRs), which offer effective control of broadband polarization transformation. For example, an MTR may include an arrangement of at least two general nematic liquid crystal layers on a single substantially uniform alignment surface, where at least one of the layers has a nematic director (i.e., local optical axis) that is twisted over the thickness of the layer, and where subsequent layers are aligned directly by the prior layer's exposed surface. This allows for less complex fabrication, achieves automatic layer registration, and results in a monolithic film having a continuously varying local optic axis over the thickness thereof. In contrast, in many conventional approaches, layers are typically formed separately and subsequently assembled, and the twist angle at the end of one layer is typically not aligned with or parallel to the start angle of the next twist layer.

In addition, structures in accordance with embodiments of the present invention form a monolithic birefringent plate that accomplishes well-controlled polarization transformation for nearly any wavelength, bandwidth, or incidence angle range desired, including broadband (i.e., achromatic) quarterwave and halfwave retardations over a wavelength range of greater than about 15% (e.g., 100 nm), about 35% (e.g., 200 nm), or more, with respect to a central wavelength (e.g., 550 nm). In particular embodiments, two or three layers can be used to achieve broadband quarterwave and halfwave retardations with excellent performance and potentially very low cost. Additional layers may enable even finer control over the polarization transformation profile as a function of wavelength or viewing angle, in a fashion similar to additional terms in a Fourier Series. In some embodiments, the use of such additional layers may allow for MTR designs having a true optical axis, that is, a direction along which linear polarization is preserved. The precise relationship desired between the input and output polarization may be independent of wavelength (as in the broadband quarterwave and halfwave examples described herein), or it may be some non-constant and non-trivial function of wavelength that depends on the application (as in the compensation film and telecom examples described herein). Due to their less complex fabrication and many degrees of freedom, MTRs as described herein can be especially well-suited for patterned achromatic retarders, and can achieve large bandwidth and/or low-variation of retardation within visible thru infrared wavelengths. However, while generally described herein with reference to achromatic (or approximately constant) retardation spectra over a relatively wide wavelength range, it will be understood that MTRs in accordance with embodiments of the present invention may not be so limited, and can be configured to provide different retardations over different regions of a given spectrum. For example, one embodiment of a non-achromatic retardation spectrum would be an MTR configured to provide approximately halfwave retardation for green wavelengths (e.g., wavelengths that fall within the range of the visible spectrum corresponding to the color green), but approximately zero retardation for red and blue wavelengths. In another embodiment of a non-achromatic retardation spectrum, an MTR could be configured to provide approximately halfwave retardation for longer wavelengths (e.g., infrared), and a different retardation for shorter wavelengths (e.g., visible).

Related U.S. Patent Application No. 60/912,044 also describes achromatic polarization transformation using two twist layers that define a single film or monolithic element on an alignment surface. In some embodiments described therein, the alignment surface may be patterned by a polarization hologram such that a spatially non-uniform periodic pattern is present. Therefore, the optical effect on incident light achieved in those embodiments is diffraction (i.e., changing the propagation direction), rather than retardation (i.e., changing polarization) as achieved by embodiments of the present invention described herein.

Retarders as described herein are birefringent elements that can transform polarization without substantially affecting propagation direction by inducing different phase shifts between orthogonal electric-field components of electromagnetic waves, and are also referred to as wave plates. Some basic retarders may be defined by a homogeneous uniaxial birefringence $\Delta n$ with a thickness $d$, and may have a phase retardation $\Gamma = 2\pi \Delta u d/\lambda$ that varies strongly with wavelength $\lambda$.

Broadband (including achromatic) polarization transformation that can be precisely controlled over a broad range of wavelengths can be especially important in applications that involve human perception or multiple simultaneous channels at different wavelengths. Unfortunately, the spectral dispersion of the birefringence $\Delta n(\lambda)$ of many optical materials may not typically enable broadband polarization transformation within one plate. Instead, several techniques involving multiple birefringent plates have been developed that achieve broadband behavior via the principle of retardation compensation, where a deficiency in the retardation of one plate is at least partially corrected by a subsequent plate; however, these techniques may suffer from fabrication complications similar to the previous approaches, due to the use of multiple elements that are fabricated individually and subsequently aligned. The fabrication complications may be further magnified in instances where each LC element includes two substrates and two LC alignment layers (with their own alignment challenges).

In contrast, optical films or elements in accordance with some embodiments of the present invention include a single alignment surface, on top of which is arranged at least two twisted birefringent optical retarder layers (for example, general twisted nematic liquid crystal layers), and may be generally referred to herein as multi-layer twisted retarders or Multi-Twist Retarders (MTRs). The local optical axis (e.g. the nematic director of the liquid crystal), represented by the cylindrical shapes shown in the figures, is (at the bottom of any layer) established by the alignment direction of the surface below it, providing a monolithic film having a continuously-varying optical axis over the thickness of the film.

FIG. 1 illustrates an optical element or film (referred to herein as a MTR) 100 according to some embodiments of the present invention in cross section. As shown in FIG. 1, a second optical retarder layer 102 is formed on a first optical retarder layer 101 to form a multi-layer structure. The first and second layers 101 and 102 may have molecular structures that are rotated over respective thicknesses $d_1$ and $d_2$ thereof, according to a same or opposite twist sense relative to one another. For example, the first and second layers 101 and 102 can include chiral molecules (i.e., asymmetric molecules having different left-handed and right-handed forms) of the same or opposite handedness. As such, in some embodiments, the second layer 102 may have a phase shift of its local anisotropy pattern over a thickness $d_2$ that is different to and/or opposite that of the first layer 101 over a thickness $d_1$. In FIG. 1, the first and second layers 101 and 102 are illustrated as chiral liquid crystal (LC) layers. The thicknesses $d_1$ and $d_2$ are respectively defined between opposing faces of the first and second optical layers 101 and 102, and the thicknesses $d_1$ and $d_2$ may be different in some embodiments. More generally, in embodiments described herein, an optical film may include two or more layers, where at least two of the layers have different twist angles (including different twist senses) and/or different thicknesses.

In particular, as shown in FIG. 1, the molecules of the second layer 102 are of an opposite handedness (e.g., right handed) as compared to the molecules of the first layer 101 (e.g., left handed). For example, the first layer 101 may be doped with a chiral molecule such that the orientation of the molecules therein may be rotated or "twisted" by a twist angle $\phi_1$ over the thickness $d_1$ of the layer 101, and the second layer 102 may be doped with another chiral molecule such that the orientation of the molecules therein may be rotated or "twisted" by a different twist angle $\phi_2$ over the thickness $d_2$ of the layer 102. The first twist angle $\phi 1$ or the second twist angle $\phi_2$ may be 0° in some embodiments. In fabricating the first and second layers 101 and 102, a nematic LC mixture may be doped with chiral LC molecules configured to induce the respective twist angles therein without substantial defects. The respective twist angles $\phi_1$ and $\phi_2$ may be altered by varying an amount of chiral dopant and/or varying a thickness of an optical retarder layer. The "twisting" of the molecules in each optical layer 101, 102 may provide a continuous phase-shifting in the local anisotropy pattern over its respective thickness $d_1$, $d_2$.

As further illustrated in FIG. 1, the molecules of the first and second optical layers 101 and 102 are aligned or in-phase at the interface 109 therebetween. In particular, the respective molecular molecules of the first and second optical layers 101 and 102 have a substantially uniform (e.g., non-spatially varying) orientation in a direction along a plane or direction of the interface 109. As such, the first and second optical layers 101 and 102 define a monolithic optical element or film 100 having a continuously varying molecular orientation in a direction along the respective thicknesses thereof, and having a non-varying or substantially uniform molecular orientation in a direction along the interface therebetween.

In the example illustrated in FIG. 1, the first and second optical layers 101 and 102 are provided on an alignment surface 115, which has a substantially uniform alignment direction left-to-right at an azimuthal angle (also referred to herein as a start angle $\phi_0$) within the plane of the alignment surface 115. The nematic director orientation within the first layer 101 starts from this azimuthal angle $\phi_0$ at the interface with the alignment surface 115, and then twists throughout its thickness $d_1$ by the twist angle $\phi_1$, induced by the chiral nature of the twisted nematic liquid crystal material employed in the first layer 101, to some final azimuthal angle $\phi_0+\phi_1$, which provides the alignment for the second layer 102. The nematic director orientation within the second layer 102 at the interface 109 with the first layer 101 may or may not correspond to the alignment condition on the alignment surface 115, depending on the value of $\phi_1$. The nematic director orientation of the second layer 102 starts from the angle $\phi_0+\phi_1$ at the interface 109 with the first layer 101, and twists throughout its thickness $d_2$ by a twist angle $\phi_2$ to some final azimuthal angle $\phi_0+\phi_1+\phi_2$. This continues similarly for subsequent twisted nematic layers that may be formed on the second layer 102, employing the following general principle: the first layer 101 is aligned by the alignment surface 115, and every subsequent layer is aligned by the prior surface, to form a single, indivisible thin-film.

In some embodiments, the first and second layers 101 and 102 may be formed using liquid crystal pre-polymer and solvent mixtures. For example, the first layer 101 may be formed by spin-casting a first chiral nematic LC material (i.e., a non-chiral nematic liquid crystal layer doped with a chiral liquid to provide a predetermined handedness or twist sense) on the alignment surface 115 such that it reaches a desired thickness $d_1$. In some embodiments, the alignment surface 115 may be a rubbed polyimide alignment layer or a photo-alignment layer that is formed on a transparent substrate, such as a glass substrate, by techniques that will not be discussed further herein. The molecules of the first chiral LC material may be aligned by the uniform alignment condition provided by the alignment surface 115 (e.g., along the azimuthal angle $\phi_0$), and the first chiral LC material may be polymerized, for example, using a blanket ultraviolet (UV) exposure, to permanently fix the optical anisotropy therein to form the first optical layer 101. A second chiral nematic LC mixture doped to provide the same or opposite handedness/twist sense may be spin-cast or otherwise directly applied on the first layer 101 until it also has a desired thickness $d_2$, and the molecules of the second chiral LC material may be aligned in accordance with the molecules of the first layer 101 at the interface 109 therebetween. In other words, the surface of the first layer 101 may act as an alignment surface for the second chiral LC mixture. The second chiral LC mixture may then be polymerized to form the second layer 102. Other dopants may also be included within any of the twisted liquid crystal layers 101 and 102, such as dichroic or fluorescent dyes or nanoparticles.

In other embodiments, a switchable liquid crystal optical film may be formed. More particularly, the first layer 101 may be formed as described above with a predetermined handedness or twist sense and a desired thickness $d_1$ on a first alignment surface. An opposing transmissive substrate (such as a glass substrate) including a second alignment surface thereon may be laminated to the first layer 101 with a cell gap corresponding to the desired thickness $d_2$. The second alignment surface may include an alignment condition that is offset relative to that of the surface of the first optical layer 101 based on the twist sense of the first optical layer 101. The gap between the second alignment surface and the first layer 101 may be filled with a chiral nematic LC material having the opposite twist sense to provide a liquid crystal layer as the second layer 102 and thereby define the switchable liquid crystal optical film. The orientation of the molecules of the second layer 102 may switched between a first state that does not substantially affect the polarization of the light traveling therethrough and a second state that alters the polarization of the light traveling therethrough in response to a voltage applied to the second layer 102.

In some embodiments, a rubbed polymer or a linear photopolymerizable polymer (LPP) may be used to form the alignment surface 115. A laser, or any narrowband light source (sometimes in the UV wavelength range) including some lamps, may be used to expose or form an alignment condition having spatially uniform azimuth and tilt angle boundary conditions onto the photo-alignment surface 115. After exposure, the first and second optical layers 101 and 102 may be deposited on the alignment surface 115 by spin-coating. The first layer 101 may be a mixture composed of RMS03-001C (Merck Ltd, $\Delta n \sim 0.16$ at 589 nm) with a small amount (~0.3%) of chiral dopant CB15 (Merck Ltd, right-handedness). The second layer 102 may be deposited directly on top of the first layer 101, and may be composed of RMS03-001C doped with a small amount (~0.3%) of a different chiral dopant ZLI-811 (Merck Ltd, left-handedness) subject to a different thickness, twist sense, and/or twist angle. It will be understood, however, that many other alignment surfaces may be used in some embodiments, including but not limited to rubbed polymers (e.g., polyimide or PVA), stretched polymer films, aligned molecules acting as a polarizer, a prior liquid crystal layer (e.g. cholesteric liquid crystal), and/or a substrate itself.

Embodiments of the present invention as described herein have been simulated using a numerical computation method (Berreman 4×4 transfer matrix method), then analyzed using theoretical equations, and tested experimentally. For simplicity, reference is made to all of the above to discuss functional principles of embodiments of the invention.

Since the arrangement of optical films or other birefringent elements described herein function as a polarization transformer, there are various ways to view its optical behavior, some of which may depend on the type of transformation. For example, retardation ($\Delta nd$; in units of length) describes the relative phase difference between two orthogonal components of the polarized light output from the birefringent layer. A similar but normalized quantity called retardance ($\Delta nd/\lambda$; in units of waves), can be used for analysis across a wide range of wavelengths. In addition, in some cases, a specialized quantity may be used for analysis. Such a specialized quantity may include one of the Stokes parameters, or some function calculated therewith, such as ellipticity $e = \tan((a \sin^{-1}(-S_3)/2)$, which is a measure of the quality of transforming input linearly polarized light to output circularly polarized light.

For examples and embodiments described herein, a realistic birefringence ($\Delta n(\lambda) = 0.128 + 8340/\lambda^2$ where wavelength is in units of nm), that has some dependence on the wavelength (i.e., chromatic dispersion), can be assumed. This particular birefringence dispersion corresponds to the liquid crystal polymer RMS03-001C (Merck Ltd). While examples are described herein with reference to particular materials and characteristics thereof, it will be understood that embodiments of the present invention are in no way limited to such particular materials.

Figure 2A:
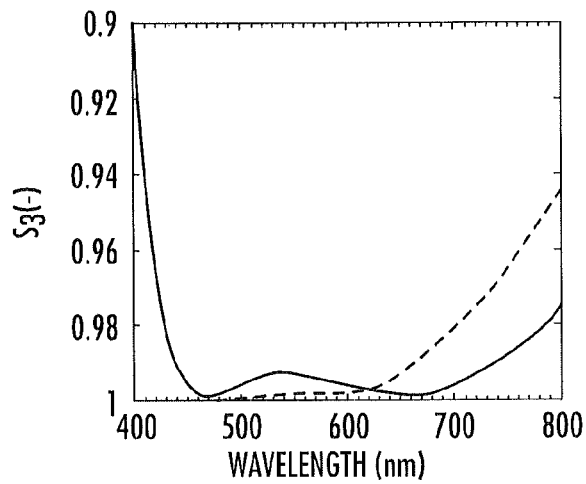
FIGS. 2A and 2B are graphs illustrating output $S_3$ parameter and ellipticity, respectively, for an optical retarder arrangement in accordance with some embodiments of the present invention as shown in FIG. 1 over a broadband wavelength range.
Figure 2B:
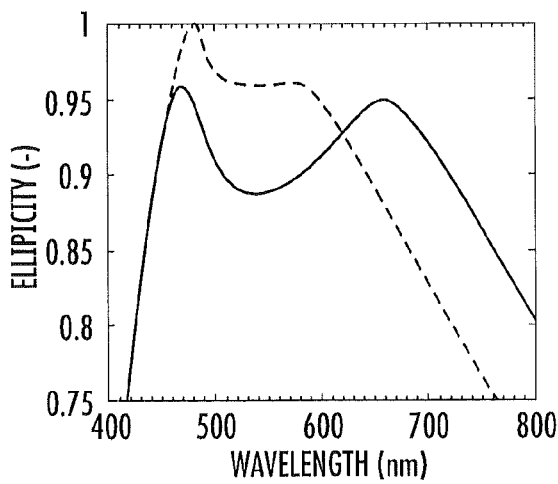

FIGS. 2A and 2B are graphs illustrating output $S_3$ parameter and ellipticity, respectively, for the multi-layer twisted retarder arrangement 100 illustrated in FIG. 1. In particular, FIGS. 2A and 2B specify two designs in accordance with embodiments of the invention that offer broadband quarterwave retardation (i.e., target $S_3 = +1.0$) for horizontal linear polarized input light (i.e., $S_1 = 1$), as representative cases. As shown in FIG. 1, two twisted layers 101 and 102 are employed, with angles and thicknesses tabulated in Table 1 (below), and are referred to herein Embodiment 1a and 1b. The output ellipticity and $S_3$ parameters shown for Embodiment 1a (solid line) and Embodiment 1b (dashed line) in FIGS. 2A-2B are both closer to the target or desired $S_3 = +1.0$ over a substantially wider bandwidth or wavelength range. The ellipticity highlights this even further: Embodiment 1a (solid line) has wider bandwidth of ellipticity >0.9, and Embodiment 1b (dashed line) has higher ellipticity (>0.95) over a wider region at the center of the spectrum.

Figure 3:
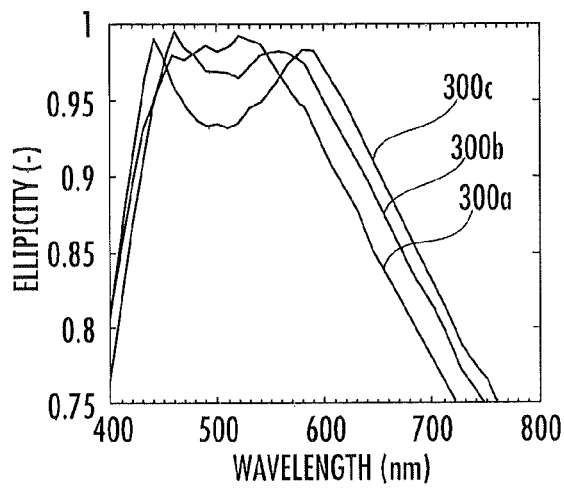
FIG. 3 is a graph illustrating the measured ellipticity over a broadband wavelength range for three example optical elements in accordance with some embodiments of the present invention.
Figure 4A:
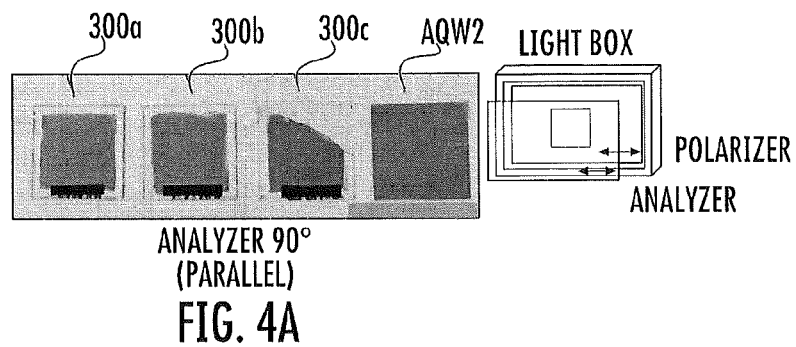
FIGS. 4A-4C are photographs illustrating the three optical elements in accordance with some embodiments of the present invention between different polarizer arrangements, in comparison with a broadband quarterwave reference film.
Figure 4B:
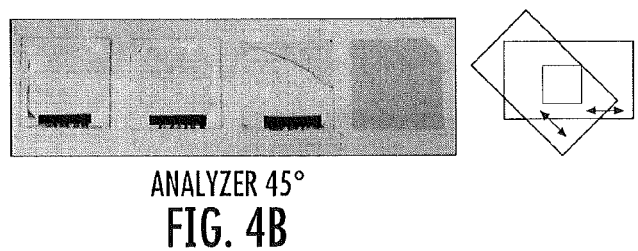
Figure 4C:
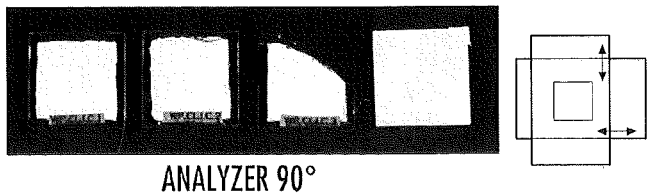

Optical films in accordance with embodiments described above have been experimentally fabricated using commercial liquid crystal and alignment materials, with results shown in FIG. 3. The chiral concentrations and spin-coater processing conditions were varied slightly. In particular, the measured ellipticity for three different sample optical films 300a, 300b, 300c in accordance with embodiments of the present invention is illustrated in FIG. 4, where the curves show broadband ellipticity consistent with the arrangement of Embodiment 1. In addition, FIGS. 4A-4C are photographs illustrating the three sample films 300a, 300b, 300c between different polarizer arrangements, in comparison with a commercial broadband quarterwave reference film "AQW2", film (vendor ColorLink Japan Ltd). In particular, FIG. 4A illustrates the three films 300a, 300b, 300c between parallel polarizers, FIG. 4B illustrates the three films 300a, 300b, 300c between polarizers arranged at a 45 degree angle, and FIG. 4C illustrates the three films 300a, 300b, 300c between crossed polarizers (arranged at a 90 degree angle). The appearances for the parallel (FIG. 4A) and crossed (FIG. 4C) cases are nearly identical, highlighting the quality of the result.

Figure 5A:
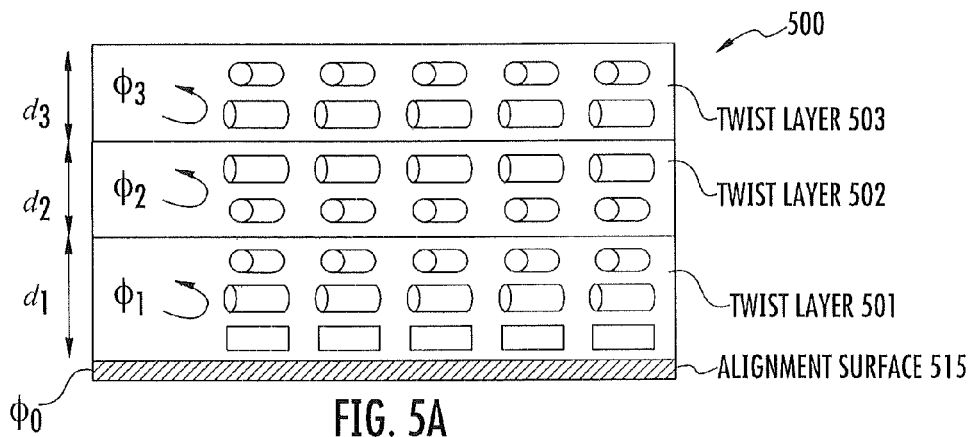
FIG. 5A is a schematic diagram illustrating an optical retarder element including three stacked birefringent layers in accordance with some embodiments of the present invention.
Figure 5B:
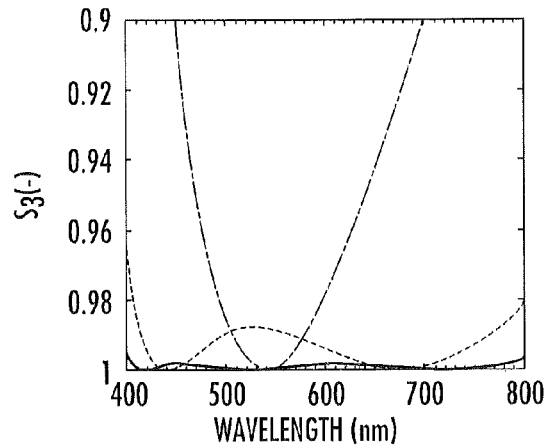
FIGS. 5B and 5C are graphs illustrating output $S_3$ parameter and ellipticity, respectively, for an optical retarder arrangement in accordance with embodiments of the present invention as shown in FIG. 5A.
Figure 5C:
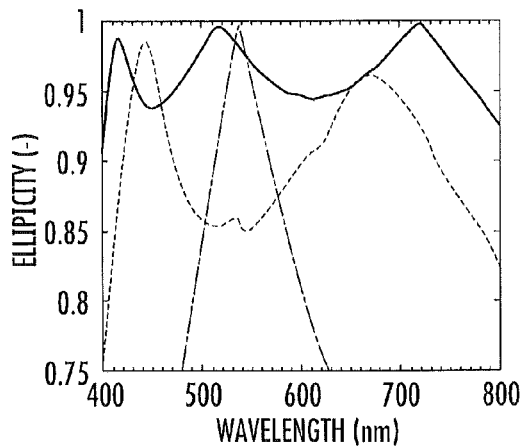

FIGS. 5B and 5C are graphs illustrating output $S_3$ parameter and ellipticity, respectively, for an optical retarder arrangement 500 including three stacked birefringent layers 501, 502, 503 in accordance with embodiments of the present invention, as shown in FIG. 5A and referred to herein as Embodiment 2. Embodiment 2 provides a multi-layer twisted retarder 500 that achieves even wider broadband quarterwave retardation than Embodiment 1. In particular, three twist layers 501, 502, 503 are formed on an alignment surface 515, with twist angles ($\phi_1$, $\phi_2$, $\phi_3$) and thicknesses ($d_1$, $d_2$, $d_3$) as shown in Table 1. As shown in FIGS. 5B and 5C, Embodiment 2 (solid line) manifests an output Stokes parameter $S_3$ close to +1 and an ellipticity e>0.95 for the entire 400-800 nm range, which provides a substantial improvement over the Example 1 (dash-dot line) and Example 2 (dot-dot line).

Figure 6A:
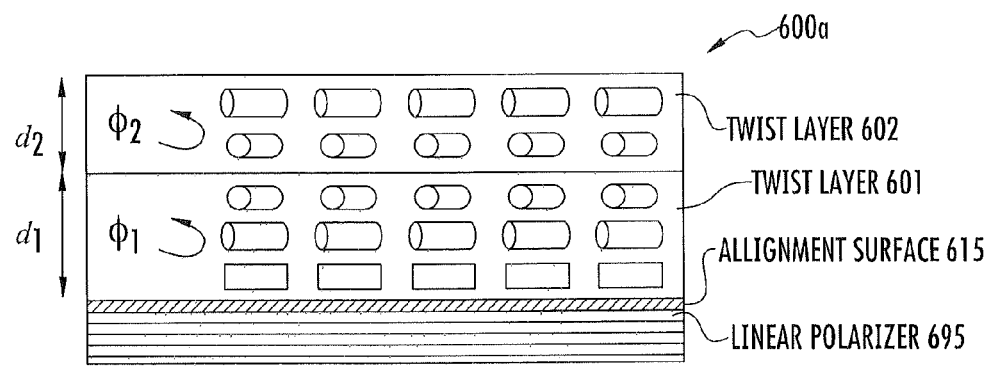
FIGS. 6A and 6B are schematic diagrams illustrating circular polarizers formed using two- and three-stacked birefringent layers on a linear polarizer, respectively, in accordance with some embodiments of the present invention.
Figure 6B:
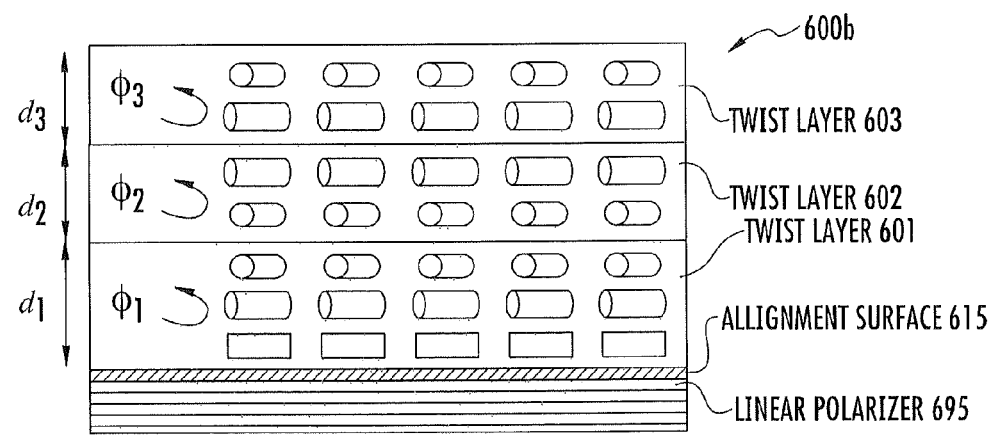

Further embodiments of the present invention may provide a circular polarizer formed by combining a linear polarizer 695 with a broadband quarterwave retarder formed according to either Embodiment 1 or 2, as shown in FIGS. 6A and 6B, respectively. In particular, FIG. 6A illustrates an arrangement 600a including two birefringent layers 601, 602 stacked on an alignment surface 615 on the linear polarizer 695, where each layer 601 and 602 has a different thickness $d_1$ and $d_2$ and twist angles $\phi_1$ and $\phi_2$ having opposite twist senses. Likewise, FIG. 6B illustrates an arrangement 600b including three birefringent layers 601, 602, 603 stacked on the alignment surface 615 on the linear polarizer 695, where layer 601 has a different thickness $d_1$ than the thicknesses $d_2$ and $d_3$ of layers 602 and 603, and where layers 601 and 603 have twist angles $\phi_1$ and $\phi_3$ having a same twist sense, which is opposite to that of the twist angle $\phi_2$ of layer 602. However, it will be understood that the alignment surface 615 may be removed after fabrication of the optical layers and/or an adhesive may be used to stack the optical layers on the polarizer 695 in some embodiments.

Figure 7A:
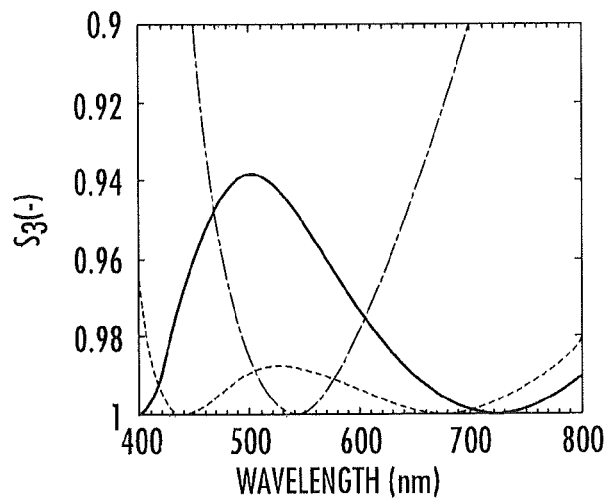
FIGS. 7A and 7B are graphs illustrating output $S_3$ parameter and ellipticity, respectively, for an optical retarder arrangement including two stacked birefringent layers in accordance with some embodiments of the present invention.
Figure 7B:
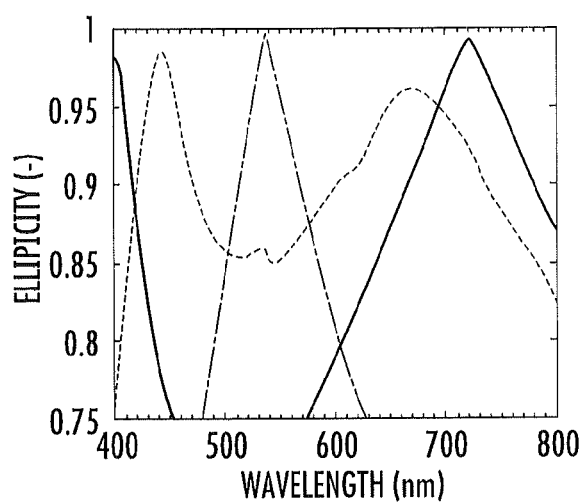

In some cases, such as optical storage devices, multiple lasers with various wavelengths are employed, and thus may only specify or require polarization transformation at or near those wavelengths. For example, a quarterwave retarder used in the optical path of an integrated BR/DVD/CD player may require an ellipticity close to 1.0 around 405 nm (BR), 650 nm (DVD), and 780 nm (CD). FIGS. 7A and 7B are graphs illustrating output $S_3$ parameter and ellipticity e, respectively, for another multi-layer twisted retarder arrangement including two stacked optical layers, referred to herein as Embodiment 3. In Embodiment 3, the two stacked twist layers and have the different twist angles and thicknesses shown Table 1, and achieve ellipticity close to 0.9 for each of these wavelength bands. In particular, FIG. 8B illustrates that the ellipticity of the arrangement of Embodiment 3 (solid line) is close to 0.9 at 405 nm, 650 nm, and 780 nm. Similar to the other embodiments described herein, since Embodiment 3 is formed on a single substrate with self-aligning layers, fabrication complexity (and therefore, cost) can be substantially reduced compared to some current products.

TABLE 1

| Embodiment | Start Angle $\phi_0$ | $1^{st}$ Twist Angle $\phi_1$ | $1^{st}$ thickness $d_1$ | $2^{nd}$ Twist Angle $\phi_2$ | $2^{nd}$ thickness $d_2$ | 3rd Twist Angle $\phi_3$ | $3^{rd}$ thickness $d_3$ |
|---|---|---|---|---|---|---|---|
| 1a | 5° | 18° | 1.7 µm | 77° | 1.0 µm | — | — |
| 1b | 60° | 30° | 0.8 µm | −90° | 1.4 µm | — | — |
| 2 | 85° | −3° | 1.1 µm | −44° | 1.9 µm | −84° | 0.8 µm |
| 3 | 5° | 24° | 1.6 µm | 69° | 0.9 µm | — | — |

TABLE 1-continued

| Embodiment | Start Angle $\phi_0$ | 1st Twist Angle $\phi_1$ | 1st thickness $d_1$ | 2nd Twist Angle $\phi_2$ | 2nd thickness $d_2$ | 3rd Twist Angle $\phi_3$ | 3rd thickness $d_3$ |
|---|---|---|---|---|---|---|---|
| 4a | 5° | 16° | 1.7 | 73° | 1.1 µm | — | — |
| 4b | 88° | −2° | 2.5 µm | −31° | 2.0 µm | −73° | 0.9 µm |

Figure 8:
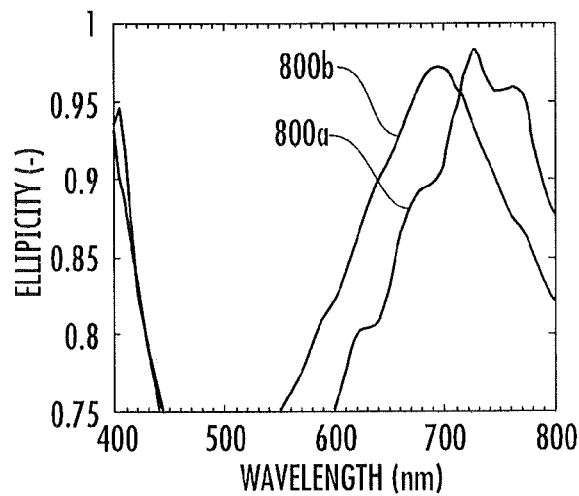
FIG. 8 is a graph illustrating the measured ellipticity for two example optical elements in accordance with some embodiments of the present invention.

Optical films in accordance with Embodiment 3 described herein have also been experimentally fabricated using commercial liquid crystal and alignment materials, with results shown in FIG. 8. The chiral concentrations and spin-coater processing conditions were varied slightly. In particular, the measured ellipticity for several different samples 800a, 800b is shown in FIG. 8, where the curves show ellipticity close to 0.9 around the laser wavelengths for BR/DVD/CD devices, consistent with Embodiment 3.

Although described above with reference to specific combinations of numbers of layers, thicknesses, and twist angles, it will be understood that one or more of these parameters may be varied in accordance with embodiments of the present invention to achieve a desired result. For example, although described above with reference to quarterwave retardation, some embodiments may provide a multi-layer twisted retarder arrangement that includes two twisted layers configured to provide broadband halfwave retardation, or any other retardance that is relatively constant with respect to wavelength.

Further embodiments of the present invention may provide a multi-layer twisted retarder arrangement that includes two or three twisted layers configured to provide broadband retardance for a wide field of view, for example, by varying the number of layers, twist angles, and/or thickness of each layer. In particular, some embodiments of the invention can be designed to offer enhanced viewing angle characteristics, in addition to enhanced broadband characteristics. For example, an optical assembly can include a linear polarizer, a quarterwave multi-layer twisted retarder, and a mirror, with light incident at several polar and azimuth angles. This assembly essentially provides a circular polarizer combined with a mirror, and can be used to provide enhanced contrast ratio for OLED displays, among other uses. In particular, the linear polarizer converts the incident light to linear polarization (for example, to horizontal linear polarization), the quarterwave retarder converts the linear polarization to circular polarization of one handedness (for example, right handed), the mirror reflects and also reverses the handedness of the circular polarization (for example, to left handed), which then passes back through the quarterwave retarder to become linearly polarized (for example, to vertical linear polarization), which is then absorbed by the polarizer.

Figure 11A:
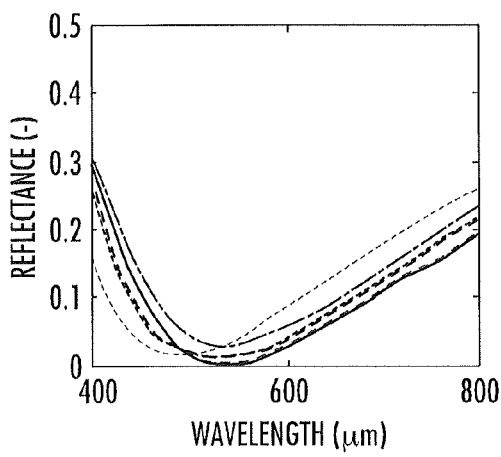
FIGS. 11A-11C are graphs illustrating reflectance characteristics for some commercial optical films.
Figure 11B:
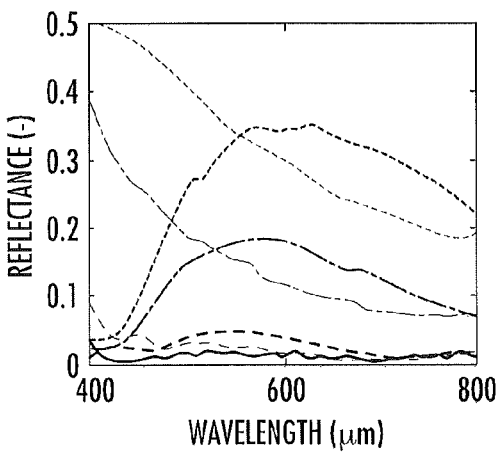
Figure 11C:
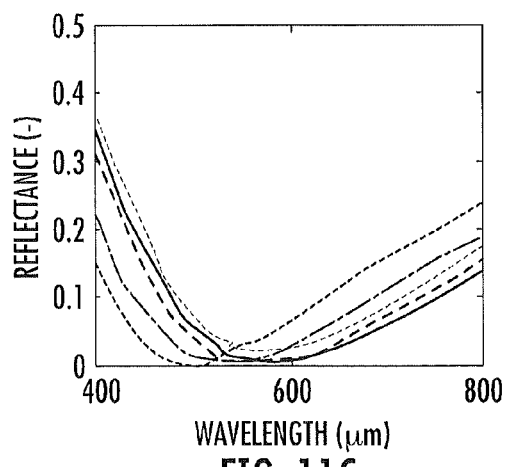

Such an assembly will not reflect incident unpolarized light (i.e., will appear dark) when the retarder provides quarterwave retardation, and will appear gray or colored when the retardation is not quarterwave (e.g., when the retarder provides retardation other than quarterwave retardation, for example halfwave retardation). Furthermore, even when the quarterwave retardation condition is met along the normal direction (i.e., 0° polar angle), larger light leakage may occur at larger angles (i.e., 30° or more). Two comparative examples of this are shown in FIGS. 11A and 11B, where FIG. 11A illustrates reflectance characteristics of a narrowband waveplate and FIG. 11B illustrates reflectance characteristics of a three-layer no-twist broadband waveplate, which are similar to the quarterwave retarders of Examples 1 and 2, discussed above with reference to FIGS. 2A and 2B, respectively. A third comparative example, shown in FIG. 11 C and referred to herein as Example 3, illustrates reflectance characteristics where the quarterwave retarder is a single twist layer (for example, of the type discussed in U.S. Pat. No. 7,187,424). The particular characteristics for the layers of each arrangement are shown in the legend. In all three comparative examples, there is substantial light leakage at some wavelengths and some angles.

Figure 12A:
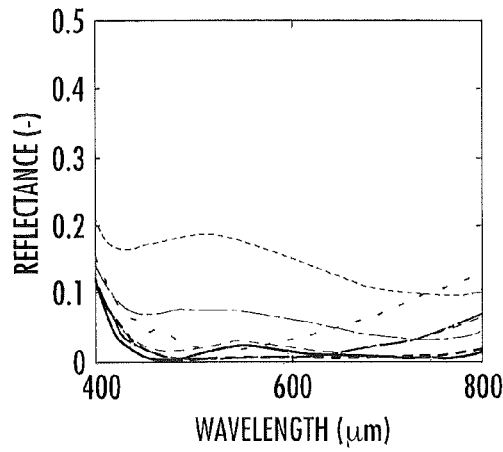
FIGS. 12A and 12B are graphs illustrating reflectance characteristics of optical retarder elements including two- and three-stacked birefringent layers, respectively, in accordance with some embodiments of the present invention.
Figure 12B:
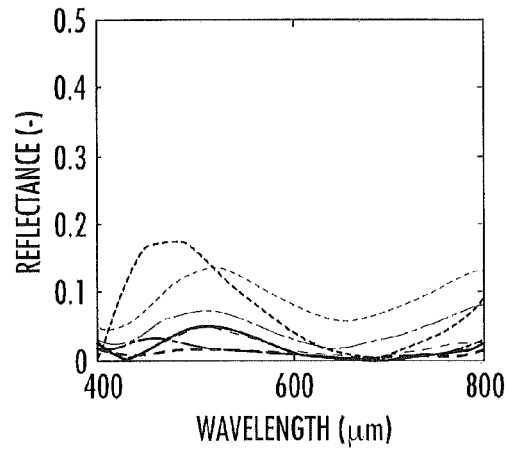

To demonstrate that multi-layer twisted retarder arrangements can improve viewing angle characteristics, the results of two designs in accordance with embodiments of the present invention are shown in FIGS. 12A and 12B. The graph shown in FIG. 12A illustrates reflectance characteristics of a MTR with two twist layers, referred to herein as Embodiment 4a, with specific details shown in Table 1 above. The graph shown in FIG. 12B illustrates reflectance characteristics of a MTR with three twist layers, referred to herein as Embodiment 4b, with specific details in Table 1 above. As shown in FIGS. 12A and 12B, for both Embodiments 4a and 4b, the reflectivity is reduced as compared to the comparative examples of FIGS. 11A-11C for nearly all wavelengths and angles.

Patterned broadband retarders formed in accordance with embodiments of the invention described above can also be arranged in a coplanar or side-by-side manner to provide multiple discrete domains. More particularly, an alignment surface can be patterned into multiple (i.e., two or more) discrete domains, where the azimuth angle $\phi_0$ is constant within each domain, but different from domain to domain, and all lateral dimensions of the domains are much larger (>100λ) than the wavelength of light (and the thickness of the birefringent layer) in order to avoid diffraction.

Figure 9A:
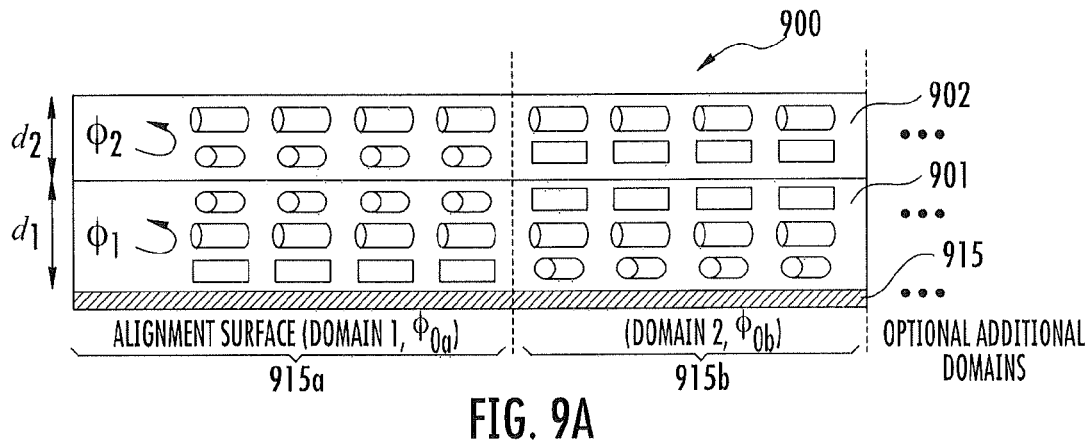
FIG. 9A is a schematic diagram illustrating an optical retarder element including two stacked birefringent layers on an alignment surface that includes two or more adjacent domains having substantially uniform but differing alignment conditions in accordance with some embodiments of the present invention.

FIG. 9A illustrates a multi-layer twisted retarder arrangement 900 including two layers 901 and 902 on an alignment surface 915 that includes two adjacent domains or regions 915a and 915b having substantially uniform but differing alignment conditions in each. When the first layer 901 is formed on the patterned, multi-domain alignment surface 915, the molecules of the first layer 901 may be aligned and uniformly oriented in accordance with the azimuth angle $\phi_{0a}$, $\phi_{0b}$ of each domain 915a and 915b, and the second layer 902 may be aligned by the first layer 901. Subsequent additional layers (not shown) may also be formed and aligned by the layer below. Also, one or more additional and/or alternating domains/regions may be provided in the alignment surface 915 adjacent the second domain/region 915b. Thus, embodiments of the present invention can provide polarization transformation with a spatial variation, e.g., quarterwave retardation that accepts linearly polarized light and converts it to circularly polarized light where each domain has a different handedness, or vice versa. Such patterned retarders can be used in 3D LCDs, polarization imaging cameras, and other optical systems including Polarization Conversion Systems (PCS). Embodiments described herein can also be used as 1D louvers, as shown in the experimental result below, and can also be 2D grid patterns, where the alignment surface provides uniformly orientation within a domain.

Figure 9B:
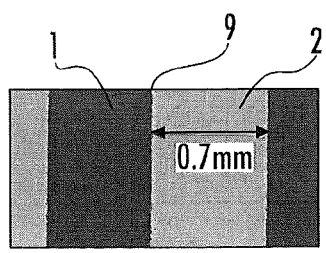
FIG. 9B is a photograph illustrating an output of an optical retarder element in accordance with some embodiments of the present invention as shown in FIG. 9A.

Optical films in accordance with the embodiment of FIG. 9A have also been experimentally fabricated using commercial liquid crystal and alignment materials, with results shown in the photograph of FIG. 9B. First, the alignment surface 915 (here, a photo-alignment polymer) was patterned using polarized-light photolithography through a chrome mask, which was used to define the multiple adjacent regions or domains 915a, 915b, each of which has a spatially uniform alignment condition. As discussed herein, a spatially uniform alignment or boundary condition is understood to be uniform within each domain 915a, 915b, and has dimensions much larger than the wavelength, to avoid diffraction. The alignment surface 915 was then coated with liquid crystal materials in a manner similar to that described above with reference to FIG. 1 and/or Embodiment 1. The photograph of FIG. 9B shows a sample, where two domains 1, 2 were created with a sharp boundary 9 between them, where both domains 1, 2 have a broadband quarterwave characteristic, but where the effective optical axis (and surface azimuth angle $\phi_{0a}$) of domain 1 is orthogonal to the effective optical axis (and surface azimuth angle $\phi_{0b}$) of domain 2.

Patterned broadband retarders formed in accordance with embodiments of the invention described above can also provide a continuously varying optical axis. More particularly, an alignment surface can be patterned such that the azimuth angle $\phi_0$ is continuously varying over the alignment surface in one or more transverse dimensions (for example, in an x-direction or y-direction only, or in both an x- and a y-direction, as defined by a plane of the alignment surface).

Figure 10A:
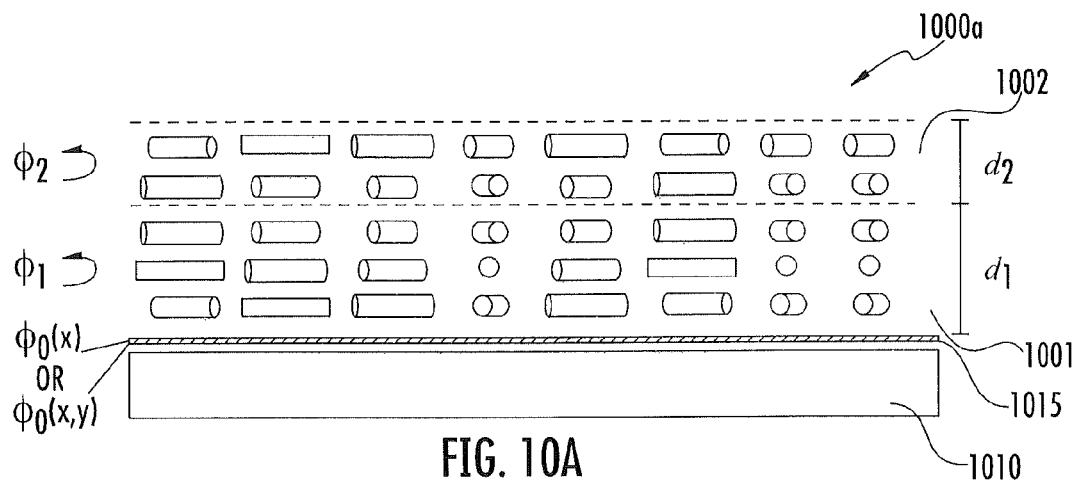
FIGS. 10A and 10B are schematic diagrams illustrating an optical retarder element including two- and three-stacked birefringent layers on an alignment surface that includes a continuously varying alignment condition in accordance with some embodiments of the present invention.
Figure 10B:
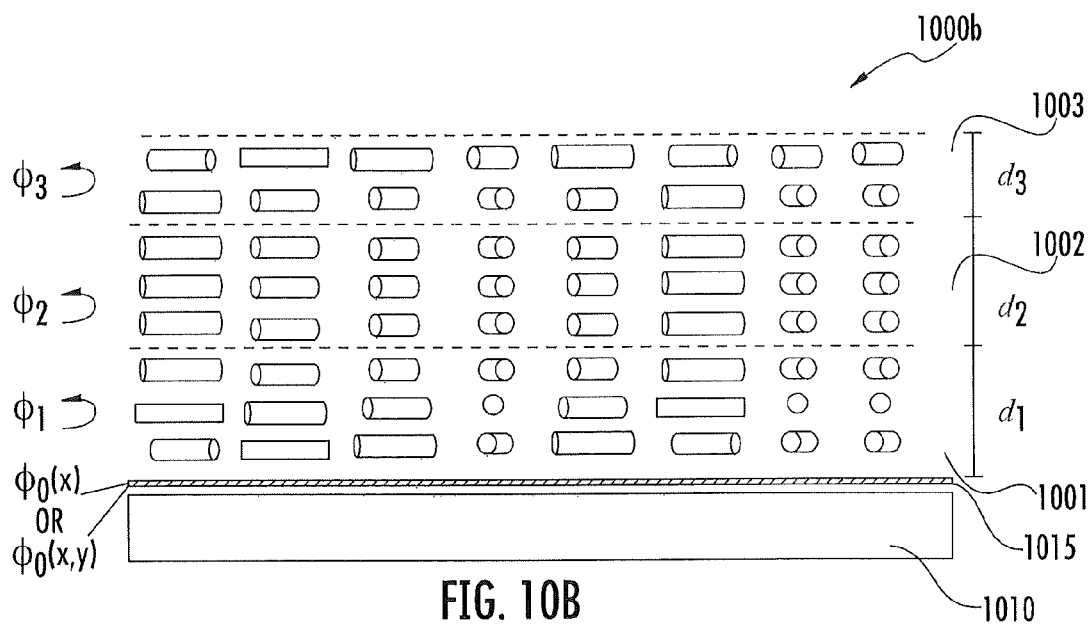

In particular, FIG. 10A illustrates a multi-layer twisted retarder arrangement 1000a including two birefringent layers 1001, 1002 stacked on an alignment surface 1015 on a substrate 1010. The alignment surface 1015 includes a continuously variable alignment condition, and each layer 1001 and 1002 has a same or different thickness $d_1$ and $d_2$ and respective twist angles $\phi_1$ and $\phi_2$ having the same or opposite twist senses. In some embodiments, the alignment pattern or condition is controlled by the azimuth angle $\phi_{0(x)}$ or $\phi_0(x,y)$, while the twist $\phi_1$, $\phi_2$ within each layer 1001, 1002 may be the same within each thickness $d_1$, $d_2$. Likewise, FIG. 10B illustrates an arrangement 1000b including three birefringent layers 1001, 1002, 1003 stacked on the alignment surface 1015 that includes a continuously varying alignment condition, where one or more of the layers 1001 1002 and 1003 have the same or different thicknesses $d_1$, $d_2$, $d_3$, and where layers 1001, 1002, 1003 have respective twist angles $\phi_1$, $\phi_2$, $\phi_3$ having a same or opposite twist sense. Thus, embodiments of the present invention can provide polarization transformation with a continuous spatial variation in one or more dimensions.

Specific non-limiting examples of polarization transformation elements according to some embodiments of the present invention are further described below in greater detail. In particular, some embodiments of the present invention provide broadband retarders, using multiple twisted LC layers on a single alignment layer and substrate, referred to herein as multi-twist retarders (MTRs). In each MTR, subsequent LC layers are directly aligned by previous ones, resulting in a monolithic film that can be produced with less complex fabrication, and is capable of retardation control for nearly arbitrary bandwidths and shapes. Some embodiments of the present invention as described herein explicitly allow for a zero twist angle (i.e., a homogeneous layer) as one possible twist layer. In other words, MTRs in accordance with some embodiments of the present invention include two or more self-aligning layers, where at least one of the two layers has a non-zero twist.

The degrees of freedom provided by the MTRs may be used to improve polarization transformation performance as compared to some traditional approaches. An additional feature of MTRs in accordance with embodiments of the present invention is that they are more easily applied on patterned substrates, including louvered wave plates, vector vortex-plates, and/or broadband polarization gratings.

Since MTRs in accordance with embodiments of the present invention include at least two twisted birefringent layers, LCs which may be formed into polymer networks (e.g., "polymerizable" LCs) may be used. LC polymers (LCPs), also called reactive mesogens, are initially low molecular weight LCs which may be aligned by surfaces (and inherent chiralities) into complex profiles, and may then be cured into solid polymer films by photo-polymerization, resulting in a "polymerized" LC layer. One feature of MTRs in accordance with embodiments of the present invention is the propagating alignment from prior layers to subsequent layers—auto-cloned alignment. In other words, MTRs formed in accordance with fabrication processes described herein may allow for spontaneous alignment of a subsequent layer, provided that the prior layer on which it is formed is well-ordered and polymerized. While nearly any LCP may be employed for MTRs as described herein, some embodiments are described with reference to RMS10-025 (Merck Chemicals Inc.), which has a reported birefringence dispersion of $\Delta n(\lambda)=0.128+8390/\lambda^2$. This real-world birefringence dispersion is assumed for simulations described herein.

Figure 13:
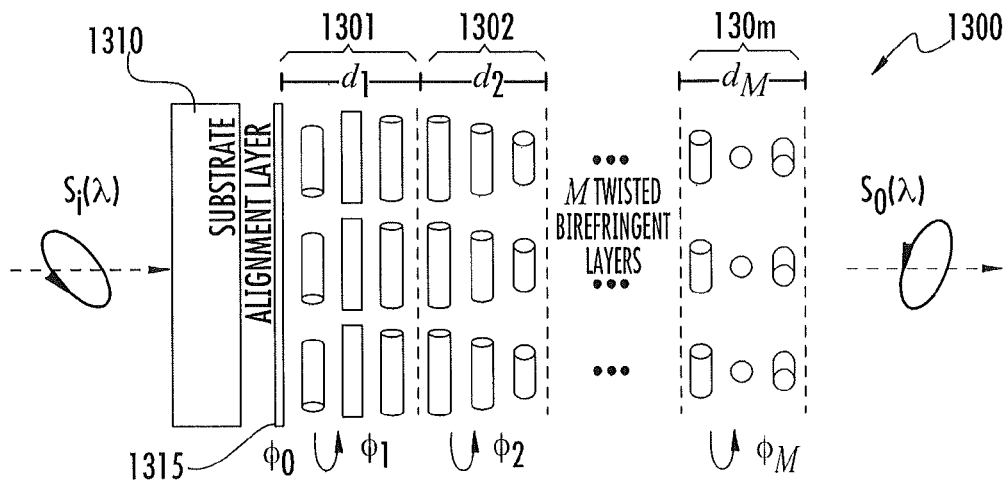
FIG. 13 is a schematic diagram illustrating a multi-twist retarder element including two or more stacked birefringent layers on a single substrate and alignment layer in accordance with some embodiments of the present invention.

As shown in FIG. 13, a unit cell of an MTR 1300 in accordance with embodiments of the present invention includes two or more birefringent layers 1301, 1302, . . . 130m, where at least some of the layers 1301, 1302, . . . 130m have different twist angles $\phi_1$, $\phi_2$, . . . $\phi_m$ and/or different thicknesses $d_1$, $d_2$, . . . $d_m$. The molecular orientations of each of the layers 1301, 1302, . . . 130m are established by the layer below, such that the respective molecular orientations of each of the layers 1301, 1302, . . . 130M are aligned at respective interfaces therebetween. As described herein, the different twist angles $\phi_1$, $\phi_2$, . . . $\phi_m$ may refer to differences in magnitude and/or differences in direction/twist sense (e.g., positive/negative in sign). The total effect of the multiple twists may be calculated using transfer matrix techniques. For a given material, an MTR 1300 with M total layers has 2M+1 parameters: each layer m has its own twist $\phi_m$ and thickness $d_m$, plus the start angle $\phi_0$ of the first twist layer that is set by the alignment layer 1315 on the substrate 1310. Using these constraints, the Mueller matrix Tm of any particular layer may be written as $$T_m = \begin{pmatrix} 1 & 0 & 0 & 0 \\ 0 & 1-2(c^2+d^2) & 2(bd-ac) & -2(ad+bc) \\ 0 & 2(ac+bd) & 1-2(b^2+c^2) & 2(ab-cd) \\ 0 & 2(ad-bc) & -2(ab+cd) & 1-2(b^2+d^2) \end{pmatrix}, \text{ with} \quad (1)$$

$$a = \cos X_m \cos \phi_m + \phi_m \sin \phi_m \sin c\, X_m, \quad (2)$$

$$b = -\zeta_m \cos(2m\bar{\phi}-\phi_m)\sin c\, X_m, \quad (3)$$

$$c = \cos X_m \sin \phi_m - \phi_m \cos \phi_m \sin c\, X_m, \quad (4)$$

$$d = -\zeta_m \sin(2m\bar{\phi}-\phi_m)\sin c\, X_m, \quad (5)$$

In the above, each layer has a normalized retardation $\zeta_m = \Gamma_m(\lambda)/2 = \pi \Delta n(\lambda) d_m/\lambda$, a parameter $X_m = \sqrt{\zeta_m^2 + \phi_m^2}$ and a biased mean $\bar{\phi} = (\Sigma_{i=0}^{m} \phi_i + \pi/2)/m$. The function sin c $X_m = (\sin X_m)/X_m$. As described herein, the optical axis is parallel to the LC nematic director; for positive Δn materials, this is the slow axis. The Mueller matrix of the whole MTR is therefore $$T_{MTR}=T_M \ldots T_2 T_1, \quad (6)$$

and the output polarization may be found as $S_o=T_{MTR}S_i$, where $S_o(\lambda)$ and $S_i(\lambda)$ are the Stokes vectors for the input polarized light and the output polarized light for each wavelength, respectively. $S=(S_0,S_1,S_2,S_3)^T$ can be measured using several approaches. Since MTRs may have an inhomogeneous profile of a uniaxial birefringence, they may in general be neither uniaxial nor biaxial on the whole. Nevertheless, an effective retardation and an optical axis direction can be calculated for the entire structure by comparing the Stokes output to that expected from a standard homogeneous retarder, for the same input polarization.

Designing an MTR typically involves choosing the 2M+1 parameters. In principle, this can be done directly using the matrix $T_{MTR}$. If a general polarization transformation problem involves a set of known input and desired output polarizations for N specific design wavelengths, then it may be possible to solve the system of equations arising from Eq. (6) to find viable exact MTR solutions when they exist. At a high level, one design process is as follows: setup a cost function $f$, and search for its global (and sometimes local) minima. This cost function may be a function of the target $S_t(\lambda)$ and the output $S_o(\lambda)$ polarization spectrum of a particular solution (given a known input $S_i(\lambda)$), or it may be a function of one of the components of $T_{MTR}[\text{row},\text{col}]$. Examples include $f=\overline{1-S_o(\lambda)\cdot S_t(\lambda)}$ and $f=\overline{1-|T_{MTR}[4,2](\lambda)|}$. It may often be desirable to apply a cost function that is even more nonlinear, so that the search converges more quickly, such as $f=\overline{1-|e(\lambda)|}$ where $e=\tan((\sin^{-1}S_3)/2)$ is the ellipticity. Note that $f$ may also be setup to include other constraints, e.g., fabrication preferences or limitations.

Even within conservative bounds for d and φ, this calculation may lead to dozens of local minima, many of which are equivalent global minima with an approximately identical $f$ result. In this underdetermined situation, convenient solutions may be ranked and selected.

Some embodiments of the present invention further provide improved or optimal designs for quarter- and half-wave phase retarders. For simplicity and clarity, these embodiments are discussed with reference to the visible wavelengths of light; however, it will be understood that the functionality of embodiments of the present invention are not limited to visible wavelengths, and may be operable over infrared and/or ultraviolet wavelengths as well. Furthermore, in some embodiments, designs for different wavelength ranges can be obtained by scaling the thicknesses of the individual layers without changing the twist angles.

Quarter-wave (QW) retarders transform input light to/from linear (e.g., $Si=(1,1,0,0)^T$) and circular (e.g., $S_f=(1,0,0,1)^T$) polarizations. Accordingly, as discussed herein, $T_{MTR}[2,2]=0$, $T_{MTR}[3,2]=0$, and $T_{MTR}[4,2]=1$, exactly for specific wavelengths, or nearly so for a given bandwidth. Examples discussed below cover two cases: achromatic QW MTRs with M=2 layers over a bandwidth range of about 200 nm (for example, 450 to 650 nm), and super-achromatic QW MTRs with M=3 layers over a bandwidth of about 400 nm (for example, 400 to 800 nm). For convenience, these designs are referred to as 2TR and 3TR designs, respectively, and are summarized in Table 2.

TABLE 2

| DESIGN | $\phi_0$ (°) | $d_1$ (μm) | $\phi_1$ (°) | $d_2$ (μm) | $\phi_2$ (°) | $d_3$ (μm) | $\phi_3$ (°) | $\overline{e(\lambda)}$ |
|---|---|---|---|---|---|---|---|---|
| 2TR QW-A | 14.3 | 1.18 | 0 | 1.13 | 83.5 | — | — | 0.97 |
| 2TR QW-B | 0 | 1.90 | 25.2 | 0.96 | 79.3 | — | — | 0.97 |
| 2TR QW-C | 65 | 0.93 | 18.8 | 1.28 | −89 | — | — | 0.96 |
| 3TR QW-A | 6.4 | 1.05 | 0 | 1.95 | 43.1 | 0.83 | 83.0 | 0.96 |
| 3TR QW-B | 0 | 1.85 | 11.4 | 1.76 | 42.3 | 0.8 | 83.0 | 0.97 |

Figures 14A, 14B:
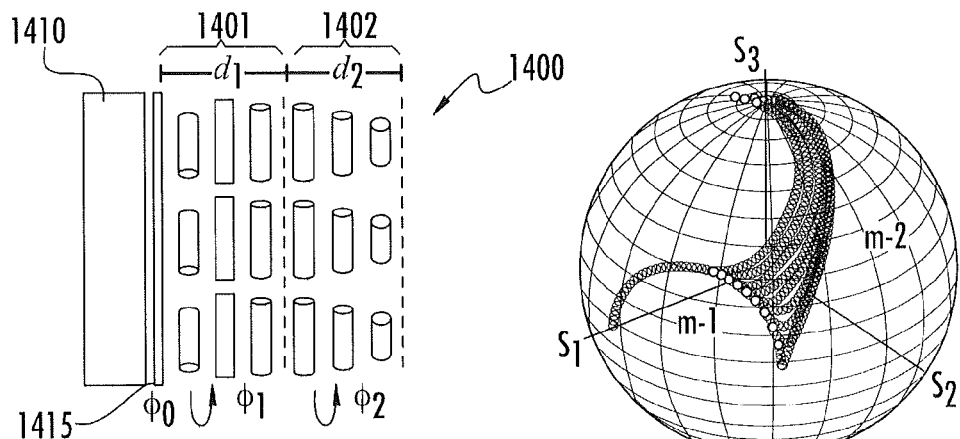
FIG. 14A illustrates a two-layer MTR design in accordance with some embodiments of the present invention.
FIG. 14B illustrates the output Stokes components provided by a two-layer MTR according to some embodiments of the present invention as shown in FIG. 14A on a Poincare sphere.

FIG. 14A illustrates a 2-layer MTR design 1400 in accordance with some embodiments of the present invention. While numerous 2TR achromatic QW designs may be possible, the cross-section shown in FIG. 14 generically illustrates the parameters which may be varied for such designs. In particular, the MTR 1400 includes first and second birefringent layers 1401 and 1402 having molecular orientations that are rotated by different twists $\phi_1$ and $\phi_2$, and/or over different thicknesses $d_1$ and $d_2$, respectively, where the respective molecular orientations of the first layer 1401 are established by a substantially uniform alignment condition (which provides a start angle $\phi_0$) in an alignment surface 1415 on a substrate 1410, and where the respective molecular orientations of the second layer 1402 are established by the substantially uniform molecular orientations provided at the surface of the first layer 1401 thereon. One particular solution is described below with reference to FIGS. 21A-21B. Notwithstanding, this and other solutions can be found using numerical optimization of the cost function $f=\overline{1-S_o(\lambda)\cdot S_t}$, within the bandwidth of about 450-650 nm.

In one example embodiment (2TR QW-A) shown in Table 2, the first layer 1401 may have a twist angle of about 0 degrees (e.g., a "zero-twist" layer), and the second layer 1402 may have a non-zero twist angle (e.g., a "non-zero twist" layer). Other example embodiments (2TR QW-B and 2TR QW-C), as shown in Table 2, involve two non-zero twist layers, with the same and opposite chiral handedness, respectively. The 2TR QW-B and 2TR QW-C arrangements may be similar to the arrangements of Embodiments 1a and 1b, respectively, in some aspects.

Figure 16A:
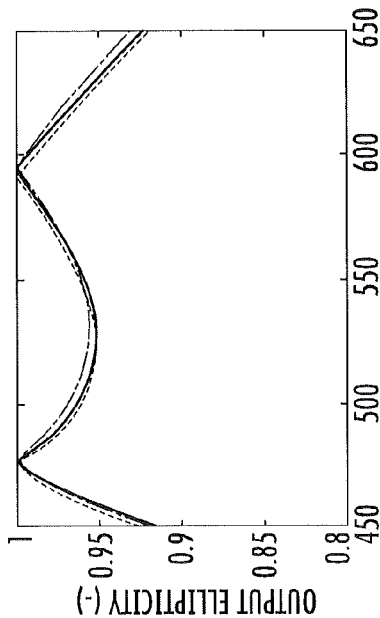
FIGS. 16A-16D are graphs illustrating the output of a two-layer quarterwave MTR in accordance with some embodiments of the present invention as compared to a known optical film for a linear (horizontal) input polarization.
Figure 16B:
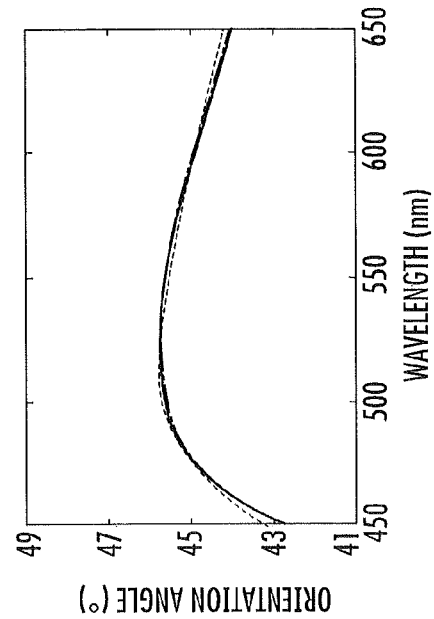
Figure 16C:
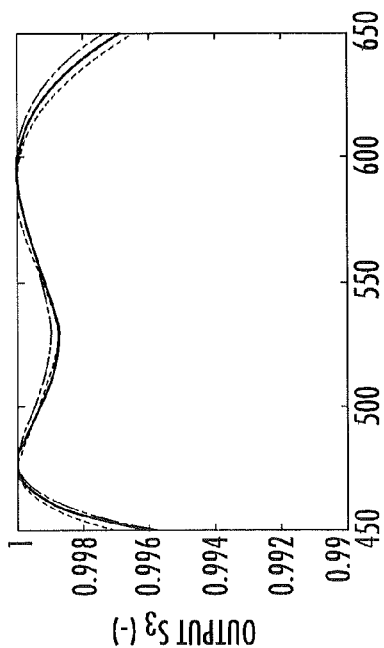
Figure 16D:
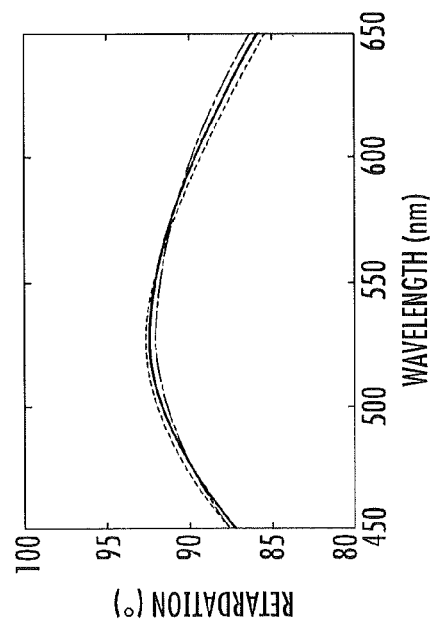

The output of 2TR QW designs for a linear (horizontal) input polarization in accordance with some embodiments of the present invention is shown in FIGS. 16A-16D for 2TR QW-A (solid lines), 2TR QW-B (dashed lines), and 2TR QW-C (dash-dot lines). In particular, FIG. 16A illustrates that the output Stokes component $S_3$ is approximately equal to 1 over the 450 nm to 650 nm wavelength range. Likewise, over the 450 nm to 650 nm wavelength range, FIG. 16B illustrates that the 2TR MTRs according to some embodiments provide a effective net retardation of about 90°, while FIG. 16C illustrates that the ellipticity e of the light output from the MTR is about 0.95 to about 1. FIG. 16D illustrates that the optical axis is oriented at an angle of approximately 45 degrees over the 450 nm to 650 nm wavelength range. Also shown (in dotted lines) is the comparison result from a traditional achromatic QW design including two homogeneous plates with thicknesses 1.75 and 0.88 μm, and with their optical axes oriented at 15 degrees and 74 degrees, respectively. As shown in FIGS. 16A-16D, the output Stokes component $S_3$, the net retardation, the output ellipticity e, and the effective optical axis orientation angle provided by MTRs according to some embodiments of the present invention are substantially similar to that provided by the traditional QW design.

FIG. 14B illustrates the output Stokes components $S_1 S_2 S_3$ provided by MTRs according to some embodiments of the present invention on a Poincare sphere. The Poincare sphere helps explain how the 2TR QW functions. In particular, FIG. 14B shows the polarization evolution through the thickness of the 2TR QW-A, across the 450 nm to 650 nm spectrum. The first layer 1401 of the 2TR QW design 1400 transforms the input linear polarization to a nontrivial elliptical polarization, which is then transformed to the target circular polarization by the second layer 1402. This is different than the path taken by the traditional design shown by way of comparison in FIGS. 16A-16D, whose first layer takes the polarization to the equator, and then up to the pole from there. As such, in contrast to some conventional approaches, the additional degrees of freedom provided by the MTR 1400 allows access to more possible polarization trajectories, thereby providing more flexibility in tuning the final polarization spectral distribution.

A practical bandwidth for QW retarders may be defined as the approximate wavelength range for which $S_3 \geq 0.995$, and equivalently $e \geq 0.9$, divided by the center wavelength. Accordingly, some 2TR QW designs in accordance with embodiments of the present invention may have a bandwidth of approximately 37%. While this is useful for many applications, substantially wider bandwidths may be provided by adding additional layers, as shown in FIG. 15A.

Figures 15A, 15B:
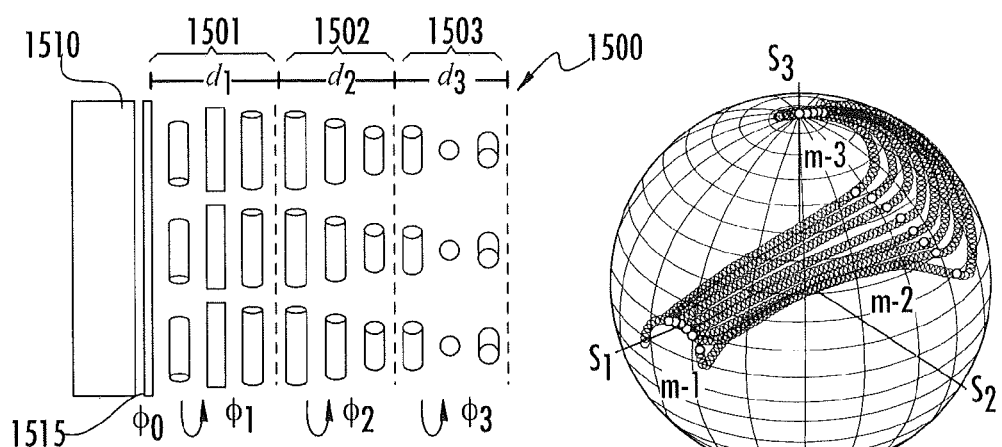
FIG. 15A illustrates a three-layer MTR design in accordance with some embodiments of the present invention.
FIG. 15B illustrates the output Stokes components provided by a three-layer MTR according to some embodiments of the present invention as shown in FIG. 15A on a Poincare sphere.

FIG. 15A illustrates a 3-layer MTR design 1500 in accordance with some embodiments of the present invention. FIG. 15A generically illustrates a cross-section including parameters which may be varied for several 3TR super-achromatic QW designs, with wider operational bandwidths than the 2TR achromatic QW designs of FIG. 14A. The same numerical optimization approach and ƒ were used as in the embodiment of FIG. 14A, but across an increased wavelength range of 400 to 800 nm. In particular, the MTR 1500 includes first, second, and third birefringent layers 1501 and 1502, and 1503 having molecular orientations that are rotated by different twists $\phi_1$, $\phi_2$, and $\phi_3$ and/or over different thicknesses $d_1$, $d_2$, and $d_3$, respectively, where the respective molecular orientations of the first layer 1501 are established by a substantially uniform alignment condition providing a start angle $\phi_0$ in an alignment surface 1515 on a substrate 1510, where the respective molecular orientations of the second layer 1502 are established by the substantially uniform molecular orientations provided at the surface of the first layer 1501 thereon, and where the respective molecular orientations of the third layer 1503 are established by the substantially uniform molecular orientations provided at the surface of the second layer 1502 thereon.

In one example embodiment (3TR QW-A) shown in Table 2, the first layer 1501 may have zero-twist, and the other two layers 1502 and 1503 may have any non-zero twist. In another embodiment (3TR QW-B), the zero-twist restriction was removed.

Figure 17A:
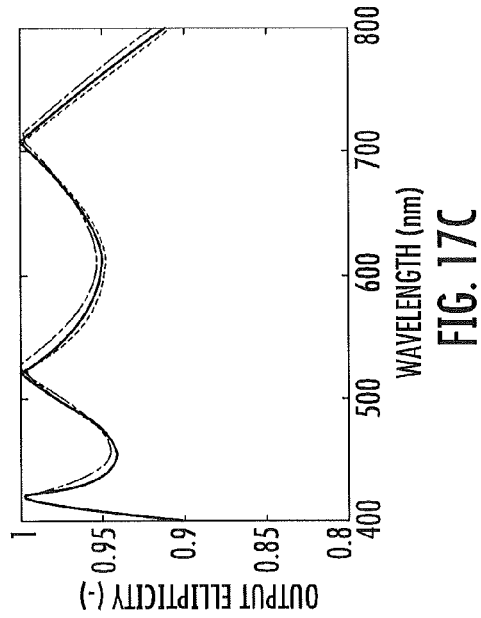
FIGS. 17A-17D are graphs illustrating the output of a three-layer quarterwave MTR in accordance with some embodiments of the present invention as compared to a known optical film for a linear (horizontal) input polarization.
Figure 17C:
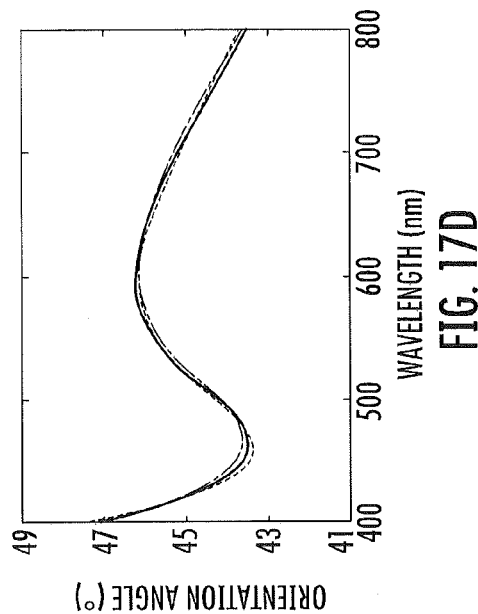
Figure 17B:
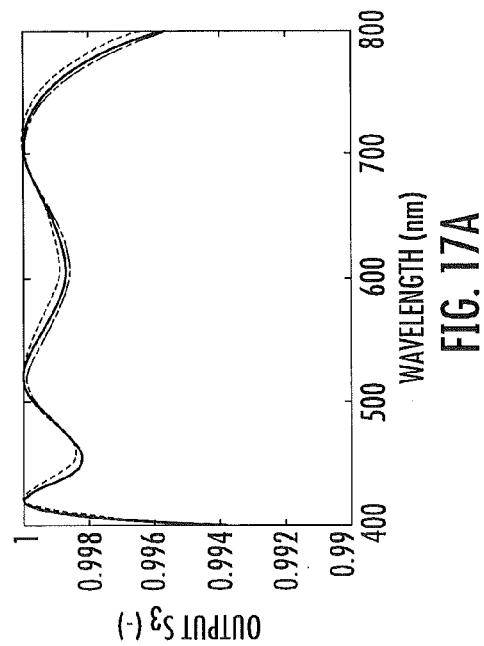
Figure 17D:
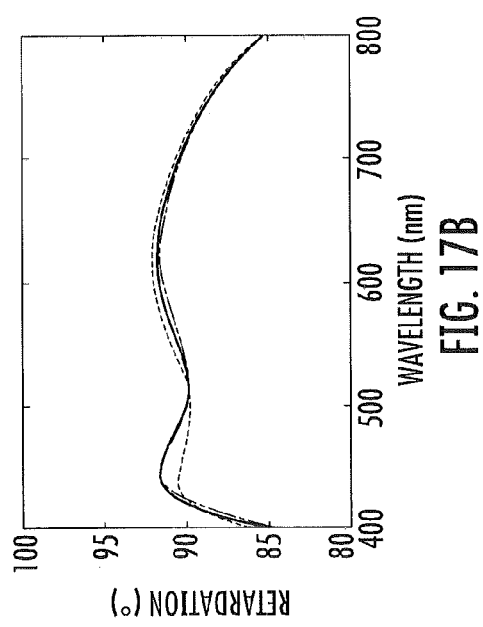

The output of some 3TR QW designs in accordance with some embodiments of the present invention is shown in FIGS. 17A-17D for 3TR QW-A (solid lines) and 3TR QW-B (dash-dot lines), with many similarities to the 2TR designs, but with a wider bandwidth. In particular, FIG. 17A illustrates that the output Stokes component $S_3$ is approximately equal to 1 over the 400 nm to 800 nm wavelength range. Likewise, over the 400 nm to 800 nm wavelength range, FIG. 17B illustrates that the 2TR MTRs according to some embodiments provide a effective net retardation of about 90°, while FIG. 17C illustrates that the ellipticity e of the light output from the MTR is about 0.94 to about 1. FIG. 17D illustrates that the optical axis is oriented at an angle of approximately 45 degrees over the 400 nm to 800 nm wavelength range. Also shown (in dotted lines) is the comparison result from a traditional super-achromatic QW design that includes three homogeneous plates with thicknesses 1.6, 1.6, and 0.8 μm, and with their optical axes oriented at 7°, 27° and 65°, respectively. As shown in FIGS. 17A-17D, the output Stokes component $S_3$, the net retardation, the output ellipticity e, and the effective optical axis orientation angle provided by MTRs according to some embodiments of the present invention are substantially similar to that provided by the traditional super-achromatic QW design.

FIG. 15B illustrates the output Stokes components $S_1 S_2 S_3$ provided by MTRs according to some embodiments of the present invention on a Poincare sphere. In particular, FIG. 15B shows the polarization evolution on the Poincare sphere through the thickness of the 3TR QW-A, across a 425 to 775 nm spectrum. The first layer 1501 of the 3TR QW design moderately fans out the polarizations near the input linear polarization. These polarizations are then transformed across the hemisphere by the second layer 1502, and finally taken up to the pole by the third layer 1503. This is different than the path taken by the traditional three-plate design, where the first two homogeneous HW retarders are aligned at specific angles such that they rotate the horizontal input to three polarization states that fall along a meridian aligned at 45° to the third homogeneous retarder, which are distributed around the equator to exactly match the dispersion of the third homogeneous retarder, which sends them to the pole.

The 3TR QW designs in accordance with embodiments of the present invention may have a bandwidth of ~75%, a factor of two greater than the 2TRs shown in FIG. 14A. As such, while not wishing to be bound to a particular theory, some embodiments of the present invention as described herein illustrate that wider bandwidths can be achieved by adding more birefringent layers.

Another polarization element provided by embodiments of the present invention is the half-wave (HW) retarder, which transforms to/from one linear polarization to another (rotated) linear polarization (lin-lin), and can be used to accomplish optical rotation. Similarly, HW retarders can be used to transform circular polarization to orthogonal circular (cir-cir) polarizations. Examples discussed below cover two HW MTR designs that accomplish both transformations. Particular 2TR and 3TR designs for the bandwidths 450-650 nm and 400-800 nm, respectively, are shown in Table 3. The following results show that the bandwidths of 2- and 3-TR HW designs are similar to the analogous QW MTRs described above (i.e., 37% and 75%, for the achromatic 2TRs and super-achromatic 3TRs, respectively). In this HW case, an analogous bandwidth definition is the wavelength range for which $|S_{(1\ or\ 3)}| \geq 0.99$, divided by the center wavelength.

TABLE 3

| DESIGN | $\phi_0$ (°) | $d_1$ (μm) | $\phi_1$ (°) | $d_2$ (μm) | $\phi_2$ (°) | $d_3$ (μm) | $\phi_3$ (°) | $S^{(1or3)}(\lambda)$ |
|---|---|---|---|---|---|---|---|---|
| 2TR HW-A | −18.5 | 1.94 | 171 | 3.20 | −62.4 | — | — | −0.99 |
| 3TR HW-A | 9.2 | 0.86 | 0 | 3.29 | 66.7 | 1.66 | 14.1 | −0.99 |
| 2TR HW-B | −3.4 | 1.56 | 69.7 | 1.56 | −69.7 | — | — | −0.99 |
| 3TR HW-B | 47.3 | 1.1 | 76.4 | 2.27 | 0 | 1.1 | −76.4 | −0.99 |

While a single twisted LC layer can accomplish rotation of linear polarizations over modest bandwidths, MTRs can be used to achieve wider bandwidths at relatively smaller thicknesses. For lin-lin HW MTRs shown in Table 3 (e.g., the 2TR HW-A and 3TR HW-A designs), input light having a horizontal linear polarization was used, and the target output polarization was set as vertical linear (e.g., $S_f=(1,-1,0,0)^T$).

Figure 18A:
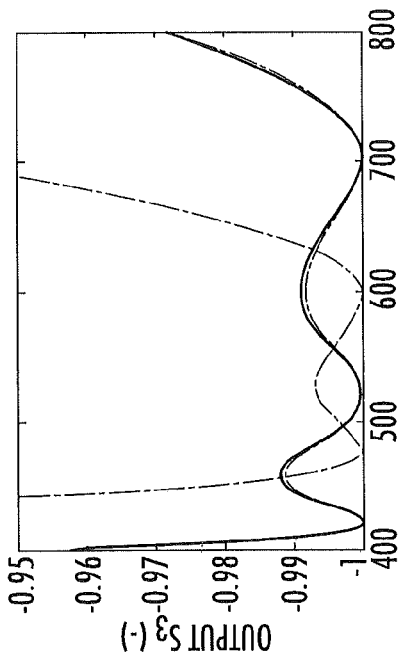
FIGS. 18A and 18B are graphs illustrating the output of two- and three-layer linear-to-linear polarization transformation designs, respectively, in accordance with some embodiments of the present invention.
Figure 18C:
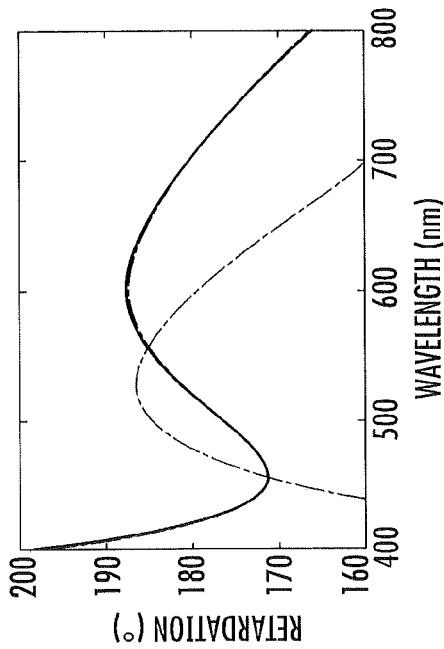
FIGS. 18C and 18D are graphs illustrating the output of two- and three-layer circular-to-circular polarization transformation designs, respectively, in accordance with some embodiments of the present invention.
Figure 18B:
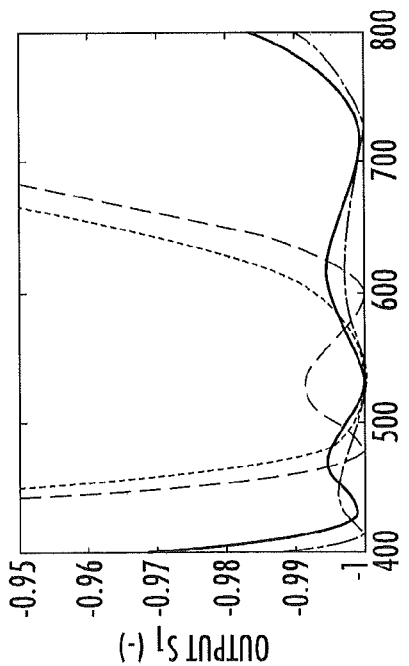

The output of the 2- and 3-MTR HW-A (lin-lin) designs in accordance with some embodiments of the present invention are shown in FIGS. 18A-18B for 2TR QW-A (dashed lines) and 3TR QW-A (solid lines). In particular, FIGS. 18A and 18B illustrate that the output Stokes component $S_1$ is approximately equal to −1 and the effective net retardation is approximately 180°, respectively. Also shown are the comparison results from a achromatic HW design that includes two homogeneous plates both with thicknesses 1.77 µm, and optical axes at 22.5° and 67.5° (dotted lines), and a design that includes three homogeneous plates with thicknesses 3.2, 1.6, and 1.6 µm, and optical axes at 19°, 93°, and 48°, respectively (dash-dot lines). Accordingly, the 2TR HW-A and 3TR HW-A designs in accordance with some embodiments of the present invention can achieve achromatic and super-achromatic HW behavior for lin-lin transformation.

Figure 18D:
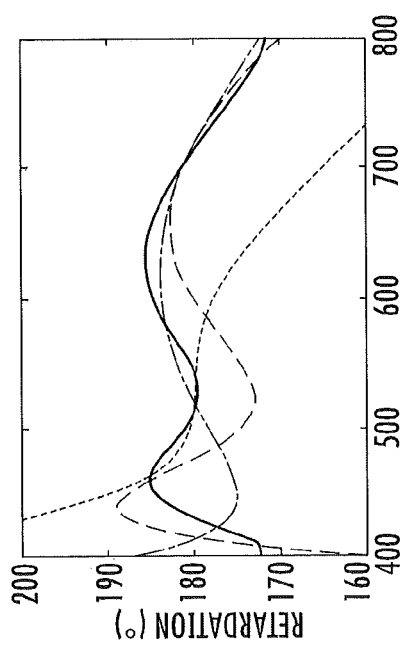

MTRs in accordance with embodiments of the present invention may also be used to provide cir-cir HW transformation, despite the fact that a single twisted LC layer does not mimic a HW retarder for circularly polarized light. For cir-cir HW MTRs shown in Table 3 (e.g., the 2TR HW-B and 3TR HW-B designs), input light having a circular polarization (e.g., $S_i=(1,0,0,1)^T$) was used, and the target output polarization was set as orthogonal to the input circular polarization (e.g., $S_f=(1,0,0,-1)^T$), The output of the 2- and 3- MTR HW-B (cir-cir) designs in accordance with some embodiments of the present invention are shown in FIGS. 18C-18D for 2TR QW-B (dashed lines) and 3TR QW-B (solid lines). In particular, FIGS. 18C and 18D illustrate that the output Stokes component $S_3$ is approximately −1 and the effective net retardation is approximately 180°, respectively, Also shown are the comparison results of an achromatic design that includes three homogeneous plates with thicknesses 0.83, 1.66, and 0.83 µm, with optical axes at 16°, 59.3°, and 16°, respectively (dotted lines), and another design that includes three homogeneous plates with thicknesses 0.81, 3.22, and 0.81 µm, with optical axes at 19.7°, 74.1°, and 19.7°, respectively (dash-dot lines), both of which have a substantially similar overlap with the 2TR HW-B and 3TR HW-B designs. Thus, the 2TR HW-B and 3TR HW-B designs in accordance with some embodiments of the present invention can achieve achromatic and superachromatic HW behavior for cir-cir transformation.

Figure 19A:
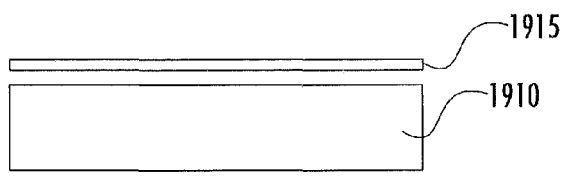
FIGS. 19A-19D are schematic diagrams illustrating an example fabrication process to form multi-twist retarder elements in accordance with some embodiments of the present invention.
Figure 19B:
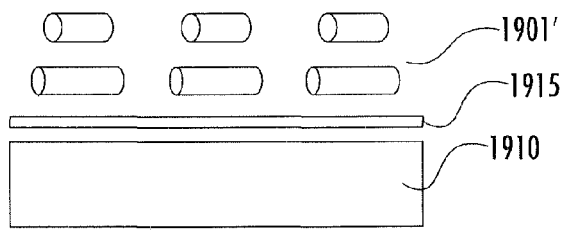
Figure 19C:
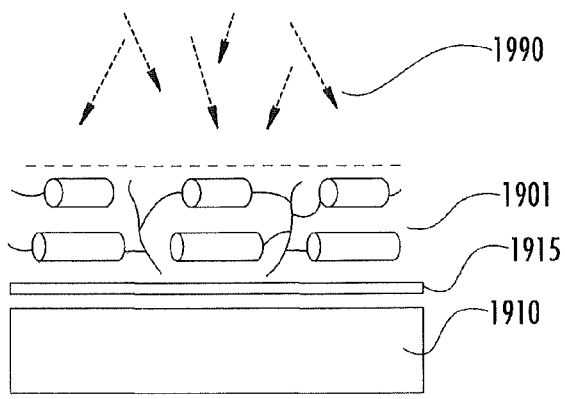
Figure 19D:
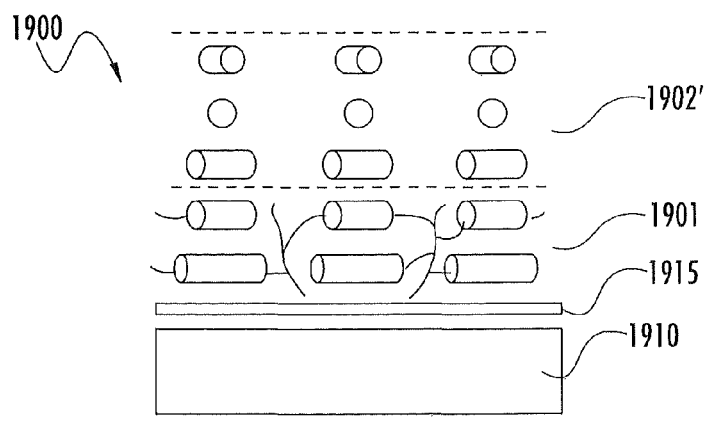

FIGS. 19A-19D illustrate an example fabrication process that may be used to form MTRs in accordance with some embodiments of the present invention. The fabrication process of FIGS. 19A-19D may employ standard tools and materials to provide MTRs with excellent optical properties. As shown in FIGS. 19A-19D, MTR fabrication involves coating at least three polymer layers. In particular, as shown in FIG. 19A, an alignment layer 1915 is applied to a substrate 1910. In FIG. 19B, a layer of LCP 1901' is coated on the alignment layer 1915 such that molecules thereof are oriented to align to an alignment condition in the alignment layer 1915 below. In FIG. 19C, the LCP layer 1901' is cured, for example by (UV) photopolymerization 1990, to form a cross-linked polymer network in the LCP 1901. In FIG. 19D, one or more additional layers LCP 1902' are coated on the layer 1901 and cured, such that molecules of the layer 1902' are aligned by the orientations of the molecules at the top surface of the immediately prior LCP layer 1901 to orient their respective start angle, until the full MTR 1900 is completed. In practice, the fabrication process of FIGS. 19A-19D may be relatively quick (e.g., a few minutes), repeatable, and scalable to large areas (for example, 2 to 6 inch diameter elements). A glass endcap may also be laminated onto the exposed LCP final layer (in the present example, layer 1902), for protection and anti-reflection effects.

In a particular example a photo-alignment material LIA-C001 (DIC Corp) was used for the alignment layer 1915, and was provided on borofloat glass (PG&O) for the substrate 1910. A 1500 rpm spin process, followed by a hotplate bake of 1 min at 100° C. was used to deposit the alignment layer 1915, which was then exposed to a UV LED source (0.5 J/cm², 365 nm, Clearstone Technologies) with a linear polarizer arranged to set the desired start angle $\phi_0$ in the alignment layer 1915. Subsequent LCP layers 1901, 1902 were based on RMS10-025, doped with various small amounts of chiral agents CB-15 and MLC-6247 (Merck Chemicals Inc), which have positive and negative twist sense, respectively, along with a solvent PGMEA (Fisher Scientific). The LCP layers 1901, 1902 were photo-polymerized under a dry nitrogen environment, with the same unpolarized UV source and fluence as for the photo-alignment layer 1915 (but without the aforementioned polarizer). Several mixtures were developed, as listed in Table 4, using the spin recipes shown in Table 5.

TABLE 4

| MIX | Materials | wt:wt Ratio | Net Chiral:LCP-solids:Solvent |
|---|---|---|---|
| Raw-LCP | (set by vendor) | (set by vendor) | 0:0.3:0.7 |
| A | CB-15(+): PGMEA | 0.02:0.98 | 0.02:0:0.98 |
| B | MLC-6247(−): PGMEA | 0.02:0.98 | 0.02:0:0.98 |
| C | Mix-A: Raw-LCP | 0.4:1 | 0.0057:0.21:0.79 |
| D | Mix-A: Raw-LCP | 0.05:1 | 0.0009:0.28:0.72 |
| E | Mix-B: Raw-LCP | 0.19:1 | 0.0032:0.25:0.75 |
| F | Mix-A: Raw-LCP | 0.13:1 | 0.0023:0.26:0.74 |
| G | Mix-A: Raw-LCP | 0.1:1 | 0.0018:0.27:0.73 |
| H | Mix-A: Raw-LCP | 0.47:1 | 0.0064:0.2:0.8 |

TABLE 5

| DESIGN | Layer 1 | Layer 2 | Layer 3 |
|---|---|---|---|
| 2TR QW-A | raw-LCP, 1000 rpm | Mix-C, 800 rpm | — |
| 2TR QW-B | Mix-D, 750 rpm | Mix-C, 1000 rpm | — |
| 2TR QW-C | Mix-E, 600 rpm | Mix-F, 1500 rpm | — |
| 3TR QW-A | raw-LCP, 2500 rpm | Mix-G, 500 rpm | Mix-H, 1300 rpm |

A measurement tool using linear polarizers (Edmund Optics Ltd) mounted within precision rotation stages (Thorlabs Ltd), and a high quality achromatic QW retarder (AQW2, Colorlink Japan, Ltd), as shown in FIGS. 5A-5C, was used to characterize example MTRs in accordance with embodiments of the present invention along with other reference samples. The Stokes parameters were measured through a series of intensity measurements collected by a spectrometer (Ocean Optics Ltd) across the desired wavelength ranges, and the data was post-processed in MATLAB to estimate the Stokes parameters, and subsequently calculate relevant parameters including the effective retardation, effective optic axis orientation, and ellipticity. The measurement tool was calibrated using a known retarder, and measurements were confirmed on a series of retarders using a commercial measurement tool (Axoscan).

Figure 20A:
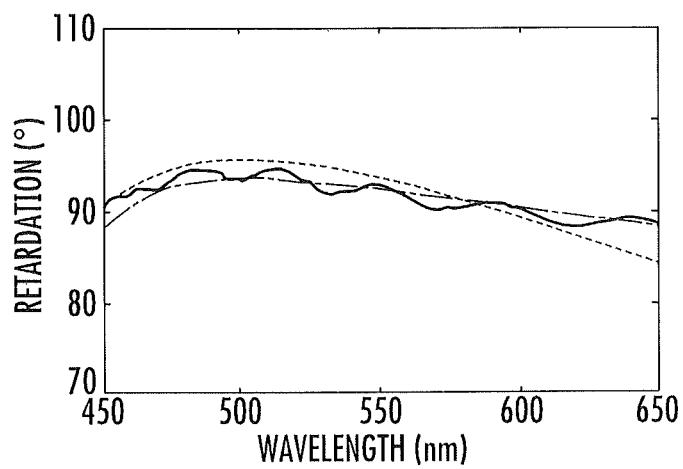
FIGS. 20A and 20B are graphs illustrating the retardation of two- and three-layer quarterwave MTRs, respectively, in accordance with some embodiments of the present invention.
Figure 20B:
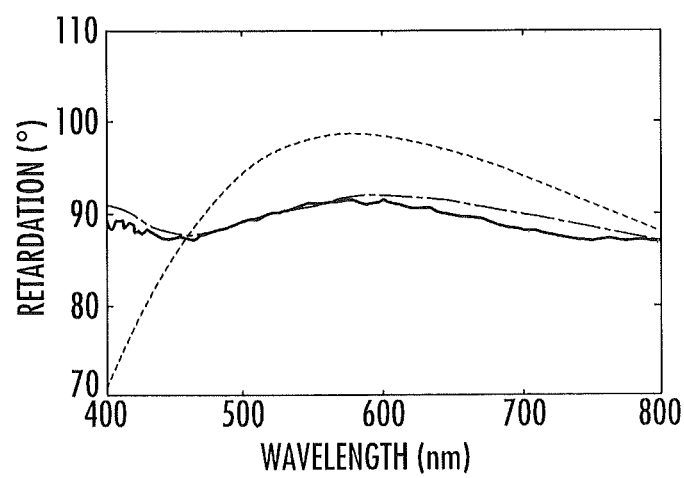

The output from QW MTRs fabricated in accordance with embodiments of the present invention is shown in FIGS. 20A-20B. The measured retardation from the QW-A designs corresponds to the spectra in FIGS. 16B and 17B. The least-squares best fit leads to estimated thicknesses and twists that are within ±4% of the target values in Table 2. The retardation measurement on the commercial AQW2 retarder and vendor-provided retardation of a commercial superachromatic QW retarder (AQWO05M-600, Thorlabs) was used as a baseline.

As shown in FIG. 20A, the measured retardation for the 2TR QW-A sample is close to the desired value of 90° across the achromatic wavelength range of 450-650 nm. For horizontally polarized input, the average ellipticity of the output from this element was measured as $\overline{e(\lambda)}=0.96$, indicating that the emerging/output light may be nearly perfectly circularly polarized, and was substantially the same as the measurement on the commercial AQW2 retarder.

FIG. 20B illustrates the measured retardation for the 3TRQW-A sample, which is likewise close to the desired value of 90° across the much larger wavelength range of 400-800 nm. For horizontally polarized input, the average output ellipticity was measured as $\overline{e(\lambda)}=0.95$. The fabrication process used in the example shown in FIG. 20B was similar to that of the 2TR QWPs, with the addition of just one extra twist layer. The 3TR QWA sample also improves upon the performance of the commercial AQWO05M-600 retarder, whose retardation spectrum has a wider deviation across the same wavelength range.

Figure 21:
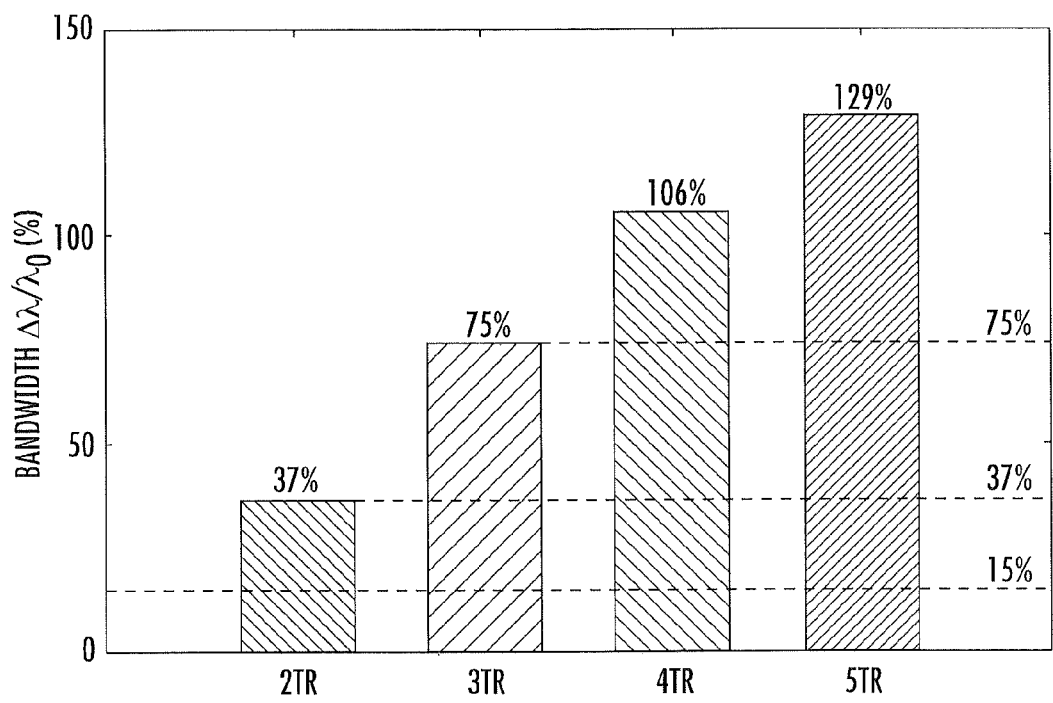
FIG. 21 is a bar graph comparing the performance trends of MTRs in accordance with some embodiments of the present invention.

MTRs in accordance with embodiments of the present invention provide phase retarders that can be designed for general polarization manipulation, and can be fabricated using less complex methods. FIG. 21 is a bar graph comparing the performance trends of MTRs in accordance with some embodiments of the present invention. As shown in FIG. 22 and discussed above, the operational bandwidth of the MTRs may increase as the number of layers M increases. As such, MTRs including 4- or 5 or more layers may provide even larger bandwidths, and may be especially well-suited to short-, mid-, and long-wave infrared wavelengths. MTRs in accordance with embodiments of the present invention may also be formed using an LC mixture which manifests a negative dispersion in the material itself. Such LC mixtures alone may achieve some bandwidth enhancement (i.e., compared to nearly all other materials) in a single layer (for example, about 15%), and thus, can be employed in the MTRs described herein to achieve a retarder with further improved performance.

It will be understood that, due to their inhomogeneous nature, MTR designs in general (and many of the comparison examples discussed above) may not have a true optical axis, a direction along which linear polarization is preserved. However, if indeed such a behavior is desired, it is possible to accomplish this in MTRs using additional layers in accordance with some embodiments of the present invention.

Figure 22A:
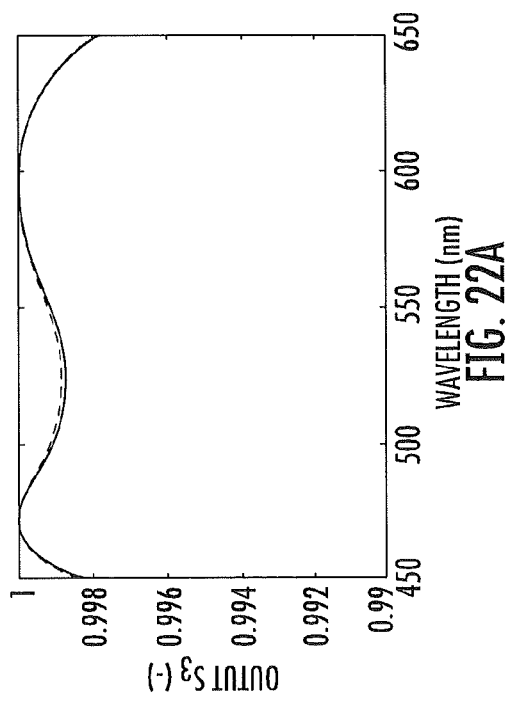
FIGS. 22A and 22B are graphs illustrating the output of a three-layer quarterwave MTR in accordance with some embodiments of the present invention as compared to a known optical film for a linear (horizontal) input polarization.
Figure 22B:
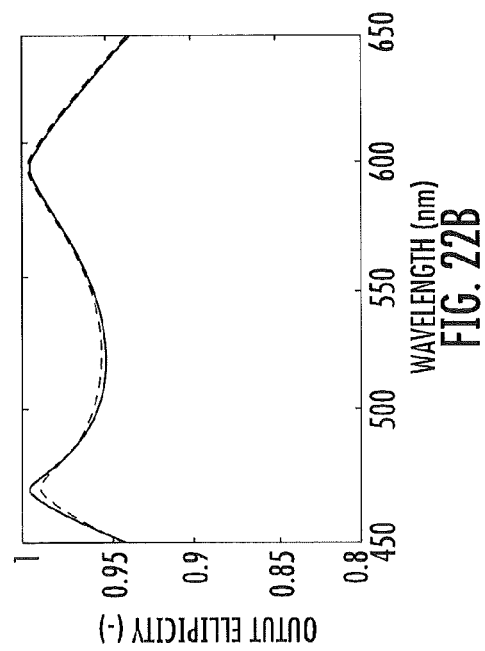
Figure 22C:
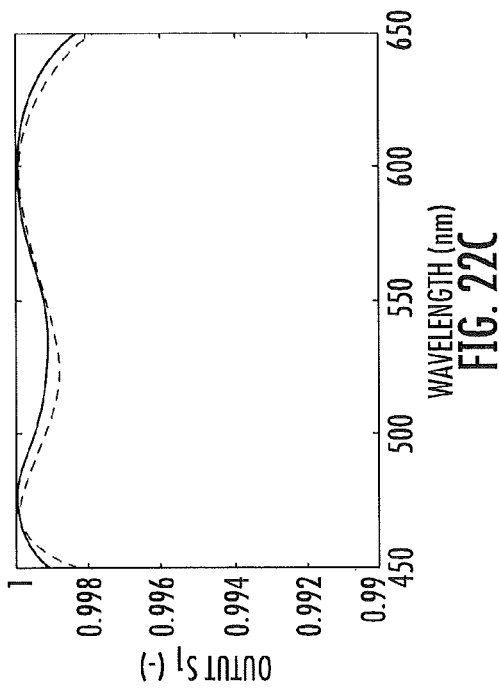
FIGS. 22C and 22D are graphs illustrating the output of a three-layer quarterwave MTR in accordance with some embodiments of the present invention as compared to a known optical film for a circular input polarization.
Figure 22D:
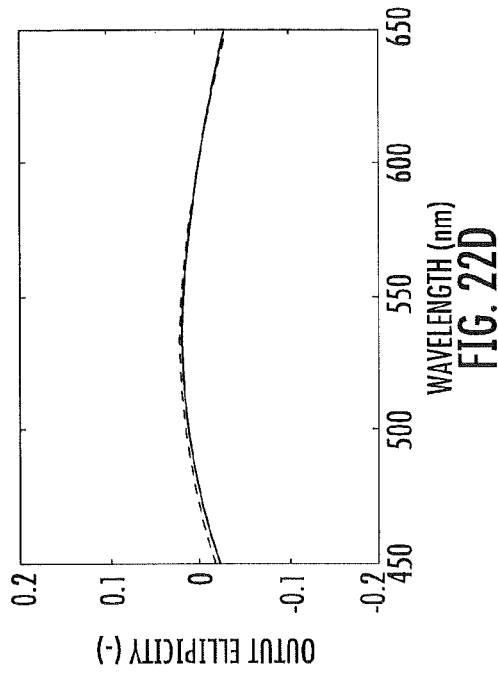

In order to design an MTR as a waveplate with retardation $\Gamma$ and a well defined optic axis, some design conditions are written in terms of the following Mueller matrix components: $T_{MTR}[2,2]=1$, $T_{MTR}[3,3]=\cos\Gamma$, and $T_{MTR}[4,3]=-\sin\Gamma$. As an example, a three layer MTR design was simulated to achieve an achromatic quarter-wave plate ($\Gamma=\pi/2$), with a true optic axis across the wavelength range of 450-650 nm. This 3TR QW-C design has the design parameters: $\phi_0=23.9°$, $d_1=0.94$ μm, $\phi_1=0°$, $d_2=0.7$ μm, $\phi_2=93.2°$, $d_3=1.85$ μm, $\phi_3=-146°$. For comparison a QHQ-QW design was simulated that consists of three homogeneous waveplates stacked on top of each other with the design parameters: $d_1=1.08$ μm, $\theta_1=15.4°$, $d_2=1.64$ μm, $\theta_2=70.1°$, $d_3=d_1$, $\theta_3=\theta_1$. The true optic axis nature of these waveplates can be verified under two cases. In FIGS. 22A and 22B, the 3TR QW-C (bold) and QHQ-QW (dashed) can accomplish broadband transformation of horizontal input ($S_1=1$) to right circular output ($S_3=1$, e=1). In addition from the same side, both the designs are able to transform left circular input ($S_3=-1$) back to horizontally polarized output ($S_1=1$, e=0) as indicated by the FIGS. 22C and 22D respectively. Similar results can be obtained across arbitrary retardations and wavelengths using the principles discussed.

Another property of MTRs is their acceptance angle (i.e., angular aperture). Preliminary simulations and experimental observations described herein suggest that the QW and HW MTRs in accordance with embodiments of the present invention behave uniformly for input light having an angle of incidence of at least 30° or more. Accordingly, in embodiments of the present invention, the input light may be fully or partially polarized, with any polarization, any wavelength, and/or angular divergence up to at about 20 degrees or more.

Due to their self-aligning behavior, the layers of the MTRs described herein may be applied onto patterned substrates, to enable complex birefringent optics. MTRs according to embodiments of the present invention may also be used as waveplates within polarization conversion systems, for example, to provide more efficient portable projectors, as described for example in commonly owned U.S. Provisional Patent Application No. 61/544,888 entitled "Polarization Conversion Systems With Polarization Gratings And Related Fabrication Methods," the disclosure of which is incorporated by reference herein.

As described herein, embodiments of the present invention provide broadband retarders using multiple twisted birefringent layers on a single substrate, also referred to as multi-twist retarders (MTRs). When formed with chiral LCs, these layers are self-aligning, use a single alignment layer, and are cheaper and easier to fabricate as compared to approaches that use multiple homogeneous retarders. Furthermore, MTRs according to embodiments of the present invention may provide improved performance (for example, in terms of bandwidth, effective retardation, and orientation angles) relative to such other approaches.

It will be understood that embodiments described herein may also include inversion of any of the embodiments above. For example, the alignment surface may be provided on another side and/or the order of the layers may be reversed in accordance with embodiments of the present invention. Also, the input and output sides of the particular MTR designs described herein may be reversed; however, care should be taken when doing so to provide the desired polarization transformation. For example, the 2TR QW-A design illustrated in Table 2 will transform linear polarization to circular polarizations when the input side is layer 1401, and circular polarization to linear polarization when the input side is layer 1402. However, if the MTR is arranged such that circular polarization is input into layer 1401, the polarization output from layer 1402 will not be linear. Furthermore, any particular twist layer described above may be fabricated via sublayers of the same material, to enable easier or lower cost thin-film coating in some cases.

As described herein, in discussing birefringent elements used in optical devices, the term "plate" is synonymous with the terms film, slab, sheet, or layer. Also, while polarization transformation effects may be described with reference to two categories (retarders and rotators), the term "retarder" is used generally herein to describe a birefringent element that changes polarization in some way, e.g., encompassing both optical rotation and birefringence retardation. It will be understood that, as described herein, the terminology "birefringent retarder", "retarder", "retardation plate", and "compensation film may be used interchangeably to refer to any birefringent plate, including homogeneous waveplates. Such birefringent plates may also be uniaxial, biaxial, or inhomogeneous. Retarders as described herein may be broadband (i.e., achromatic) or narrowband (i.e., chromatic). Retarders as described herein may therefore accomplish a polarization change via optical rotation or birefringence retardation, or any combination thereof, but may not significantly affect or alter the direction of propagation of light passing therethrough.

The present invention has been described herein with reference to some embodiments where all layers are formed from the same material with the same birefringence; however, it will be understood that embodiments of the present invention are not limited thereto, and different liquid crystal materials could be used for each layer. Also, as described herein, the phrase "twisted nematic", when used without qualification, can refer to any general twisted nematic (GTN) liquid crystal, including all twist angles that are positive, negative, or even zero. A general twisted nematic (GTN) layer can be characterized by the total twist $\Phi$ of the layer and the phase retardation angle $\Gamma$. Four general regimes on single layer: adiabatic waveguiding, birefringence, bragg, form-birefringence. When $\Phi \ll \Gamma$ then optical rotation occurs in a single twist layer (called adiabatic waveguiding, or the Mauguin regime); when $\Phi \sim \Gamma$ then birefringence retardation occurs; when $\Phi > \Gamma$ and $n_o < (\lambda/P) < n_e$ where P is the helical pitch then a circularly polarized Bragg reflection occurs; and finally when $\Phi \gg \Gamma$ then form-birefringence occurs. While the embodiments described above involve twist layers in the range of $0 \leq \Phi \sim \Gamma$ where the predominant optical effect is a superposition of both birefringence retardation and optical rotation, any GTN regime may be used in one or more of the layers described herein.

Embodiments of the present invention can provide birefringent films that are substantially uniaxial, biaxial (also referred to as trirefringent), or neither (i.e., complex retarder without an overall optical axis).

While described primarily herein with reference to optical retarder layers formed from nematic liquid crystal materials, it will be understood that other materials (including, for example, form-birefringence, metamaterials, and/or nanoparticles/wires/tubes) in accordance with embodiments of the present invention may be used to accomplish the optical effects described herein, as the optical principles may remain the same. For example, isotropic materials with sub-wavelength structures can create a form-birefringence can be structured in the same or similar way as described above. As such, it will be understood that embodiments of the present invention are not limited to the particular materials described herein, but may be implemented using any and all material layers that function as described herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. An optical element, comprising:
   first and second stacked birefringent layers configured to alter a polarization of light passing therethrough, the first and second layers having respective phase retardation angles and respective local optical axes, wherein the respective local optical axes are rotated by respective twist angles over respective thicknesses of the first and second layers and are aligned along an interface between the first and second layers,
   wherein the respective twist angles are in a range of zero degrees to the respective phase retardation angles of the first and second stacked birefringent layers, and wherein the respective twist angles and/or the respective thicknesses are different.

2. The optical element of claim 1, wherein the respective local optical axes of the first and second stacked birefringent layers are aperiodic in a direction along the interface therebetween.

3. The optical element of claim 1, wherein the first and second stacked birefringent layers comprise optical retarder layers that are respectively configured to alter the polarization without substantially altering a propagation direction of the light passing therethrough.

4. The optical element of claim 1, wherein the respective local optical axes of the first and second stacked birefringent layers are substantially uniform in a direction of alignment along the interface therebetween.

5. The optical element of claim 4, wherein the first and second stacked birefringent layers are stacked directly on one another and define a monolithic structure.

6. The optical element of claim 5, further comprising:
   an alignment surface having a substantially uniform alignment condition therein,
   wherein one of the first and second stacked birefringent layers is directly on the alignment surface such that the respective local optical axes thereof are aligned according to the alignment condition.

7. The optical element of claim 5, wherein the respective twist angles have a same twist sense.

8. The optical element of claim 5, wherein the respective twist angles are substantially equal in magnitude and opposite in twist sense.

9. The optical element of claim 5, wherein the respective twist angles are different, and wherein one of the twist angles is non-zero.

10. The optical element of claim 1, wherein the respective local optical axes of the first and second stacked birefringent layers continuously vary in a direction along the interface therebetween.

11. The optical element of claim 1, wherein the first and second stacked birefringent layers respectively include first and second adjacent regions, wherein the respective local optical axes of the first and second birefringent layers are substantially uniform in each of the first and second regions along the interface therebetween, and wherein the respective local optical axes in the first and second regions differ.

12. The optical element of claim 1, wherein the first and second stacked birefringent layers comprise a first liquid crystal layer and a second liquid crystal layer stacked thereon, wherein respective molecular orientations of the first and second liquid crystal layers are aligned along the interface therebetween, and wherein at least one of the first and second liquid crystal layers is a chiral layer.

13. The optical element of claim 12, wherein at least one of the first and second liquid crystal layers comprises a polymerized liquid crystal layer.

14. The optical element of claim 13, wherein another of the first and second liquid crystal layers comprises a switchable liquid crystal layer.

15. The optical element of claim 13, further comprising a third chiral liquid crystal layer stacked on the second liquid crystal layer.

16. The optical element of claim 1, further comprising:
a linear polarizer,
wherein the first and second optical layers are stacked on the linear polarizer with an alignment layer or an adhesive layer therebetween.

17. The optical element of claim 1, wherein the respective twist angles and/or thicknesses of the first and second optical layers are configured to provide halfwave retardation that is substantially achromatic over a broadband wavelength range of about 200 nm or more.

18. The optical element of claim 1, wherein the respective twist angles and/or thicknesses of the first and second optical layers are configured to provide quarterwave retardation that is substantially achromatic over a broadband wavelength range of about 200 nm or more.

19. A method of fabricating an optical element, the method comprising:
providing a first birefringent layer; and
providing a second birefringent layer on the first birefringent layer, wherein the first and second birefringent layers are configured to alter a polarization of light passing therethrough,
wherein the first and second birefringent layers have respective phase retardation angles and respective local optical axes, wherein the respective local optical axes are rotated by respective twist angles over respective thicknesses thereof and are aligned along an interface therebetween, wherein the respective twist angles are in a range of zero degrees to the respective phase retardation angles of the first and second stacked birefringent layers, and wherein the respective twist angles and/or the respective thicknesses are different.

20. The method of claim 19, wherein the respective local optical axes of the first and second birefringent layers are aperiodic in a direction along the interface therebetween.

21. The method of claim 19, wherein the first and second birefringent layers comprise optical retarder layers that are respectively configured to alter the polarization without substantially altering a propagation direction of the light passing therethrough.

22. The method of claim 19, wherein the respective local optical axes of the first and second birefringent layers are substantially uniform in a direction of alignment along the interface therebetween.

23. The method of claim 20, wherein the first and second birefringent layers define a monolithic structure.

24. The method of claim 23, wherein the first and second birefringent layers comprises liquid crystal layers, and wherein providing the second birefringent layer comprises:
forming the second birefringent layer directly on the first birefringent layer such that respective molecular orientations thereof are aligned according to respective molecular orientations of the first birefringent layer along the interface therebetween.

25. The method of claim 24, further comprising the following prior to forming the second birefringent layer:
forming an alignment surface having an aperiodic alignment condition; and
forming the first birefringent layer directly on the alignment surface such that the respective molecular orientations thereof are aligned according to the alignment condition along an interface with the alignment surface.

26. The method of claim 24, wherein at least one of the first and second birefringent layers comprises a chiral liquid crystal layer.

27. The method of claim 24, wherein the first birefringent layer comprises a polymerizable liquid crystal layer, and further comprising:
photo-polymerizing the first birefringent layer on the alignment surface prior to forming the second birefringent layer thereon.

28. A method of fabricating an optical element, the method comprising:
providing a first birefringent layer;
forming a second birefringent layer directly on the first birefringent layer such that respective molecular orientations thereof are aligned according to respective molecular orientations of the first birefringent layer along an interface therebetween,
wherein the first and second birefringent layers comprise liquid crystal layers, are configured to alter a polarization of light passing therethrough, and define a monolithic structure,
wherein the first and second birefringent layers have respective local optical axes that are rotated by respective twist angles over respective thicknesses thereof, are aligned along the interface therebetween, and are aperiodic in a direction along the interface therebetween, wherein the respective twist angles and/or the respective thicknesses are different, and further comprising:
forming a third liquid crystal layer directly on the second birefringent layer such that respective molecular orientations thereof are aligned according to the respective molecular orientations of the second birefringent layer along an interface therebetween.

29. The method of claim 25, wherein forming the alignment surface comprises:
forming the alignment surface to include a continuously varying alignment condition.

30. The method of claim 25, wherein forming the alignment surface comprises:
forming the alignment surface to include substantially uniform alignment conditions in adjacent first and second regions thereof, wherein the substantially uniform alignment conditions in the first and second regions of the alignment surface differ.

* * * * *